United States Patent
Tanaka

(10) Patent No.: US 10,195,742 B2
(45) Date of Patent: Feb. 5, 2019

(54) DRIVING APPARATUS

(71) Applicant: Kabushiki Kaisha Toshiba, Minato-ku (JP)

(72) Inventor: Junya Tanaka, Tokyo (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 152 days.

(21) Appl. No.: 15/262,334

(22) Filed: Sep. 12, 2016

(65) Prior Publication Data
US 2017/0182656 A1    Jun. 29, 2017

(30) Foreign Application Priority Data

Dec. 25, 2015   (JP) .................................. 2015-255111

(51) Int. Cl.
| | |
|---|---|
| B25J 19/06 | (2006.01) |
| B25J 9/16 | (2006.01) |
| B25J 9/14 | (2006.01) |
| B25J 15/00 | (2006.01) |

(52) U.S. Cl.
CPC ............. B25J 9/1694 (2013.01); B25J 9/142 (2013.01); B25J 15/0009 (2013.01)

(58) Field of Classification Search
CPC ........ B25J 9/142; B25J 9/1615; B25J 9/1674; F15B 11/16; F15B 2211/7052; F15B 2211/7107; G05B 2219/39454; G05B 2219/39462; G05B 23/0243
USPC ......... 700/258, 245, 52; 318/568.11, 568.12; 901/11, 14, 46
See application file for complete search history.

(56) References Cited

U.S. PATENT DOCUMENTS

| | | | |
|---|---|---|---|
| 2009/0173223 A1 | 7/2009 | Kudawara et al. | |
| 2011/0218676 A1* | 9/2011 | Okazaki ................. | B25J 9/1075 700/260 |
| 2013/0000480 A1* | 1/2013 | Komatsu ................ | B25J 9/1615 92/48 |
| 2013/0317647 A1* | 11/2013 | Okazaki .................. | B25J 9/163 700/250 |

FOREIGN PATENT DOCUMENTS

| | | |
|---|---|---|
| JP | 4-48592 B2 | 8/1992 |
| JP | 2002-137184 A | 5/2002 |
| JP | 5317096 B2 | 10/2013 |
| JP | 5692781 B2 | 4/2015 |
| WO | WO 2006/080088 A1 | 8/2006 |
| WO | WO 2007/094031 A1 | 8/2007 |

* cited by examiner

Primary Examiner — Dalena Tran
(74) Attorney, Agent, or Firm — Oblon, McClelland, Maier & Neustadt, L.L.P.

(57) ABSTRACT

A driving apparatus includes a joint, a first support member connected to the joint and a second support member connected to the joint. A first elastic body which is inflatable or deflatable is provided along the joint, the first support member and the second support member. A support provided with a first end portion and a second end portion opposite to the first end portion is placed between the first support member and the first elastic body, and the first end portion is connected to the joint. And, a second elastic body which is inflatable or deflatable is inserted between the support and the first support member.

18 Claims, 21 Drawing Sheets

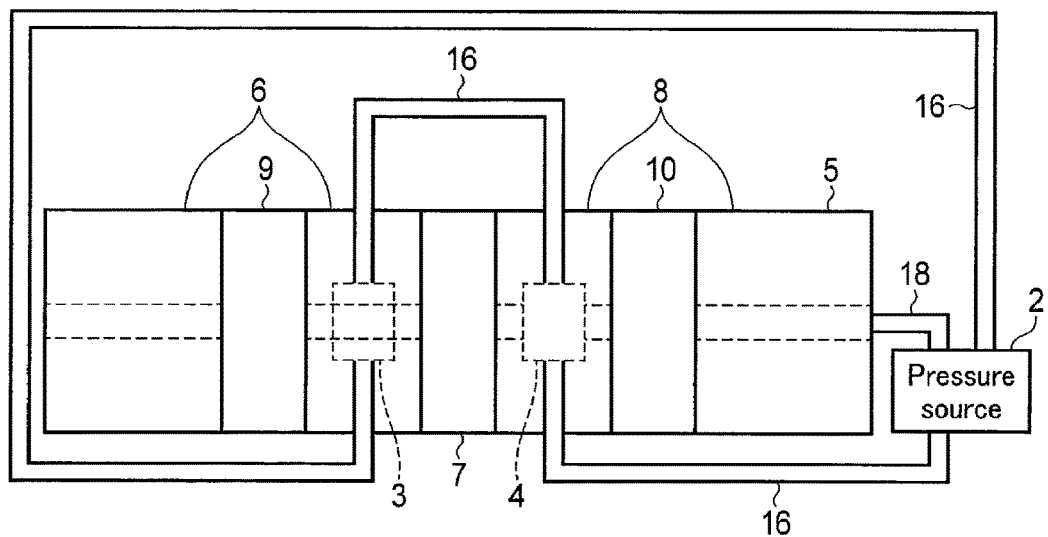
F I G. 4
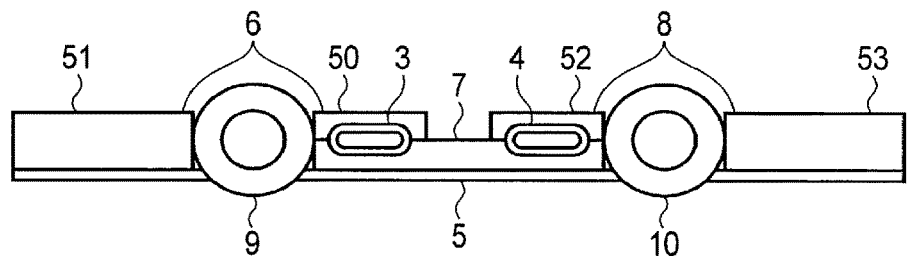
F I G. 5A
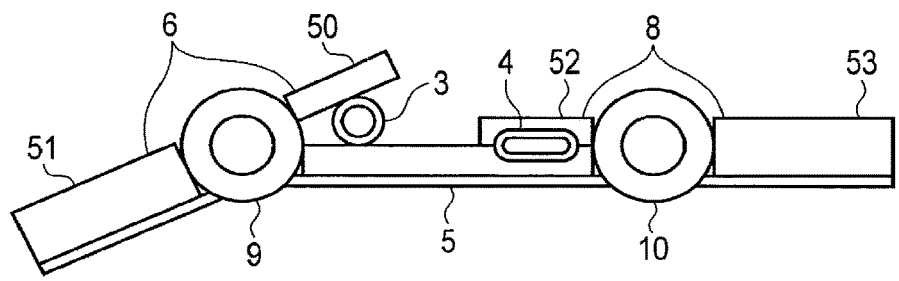
F I G. 5B

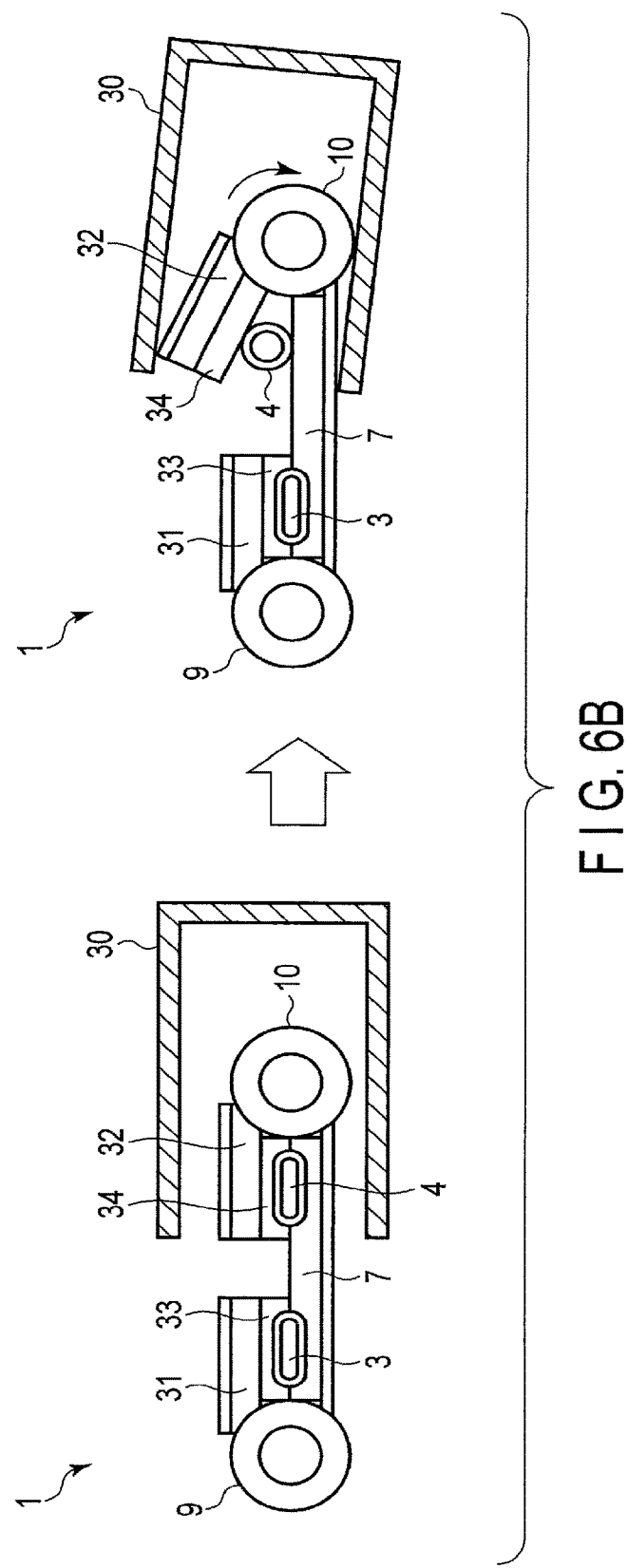
F I G. 6B

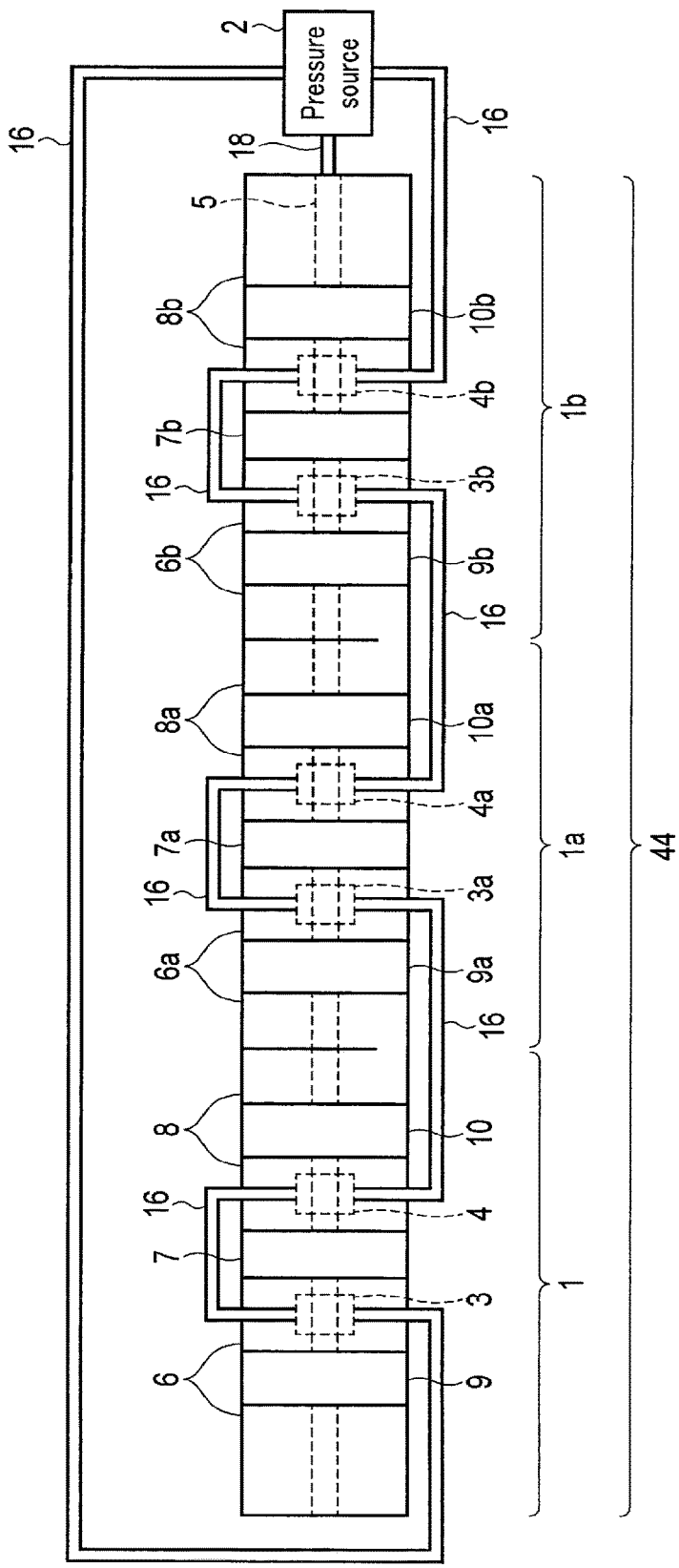
F I G. 8

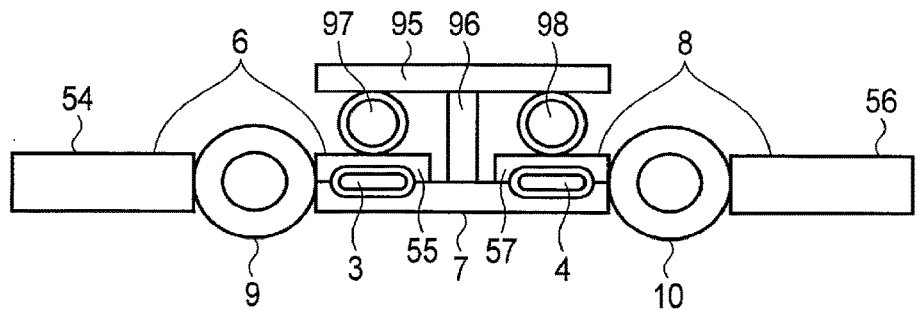
F I G. 19A
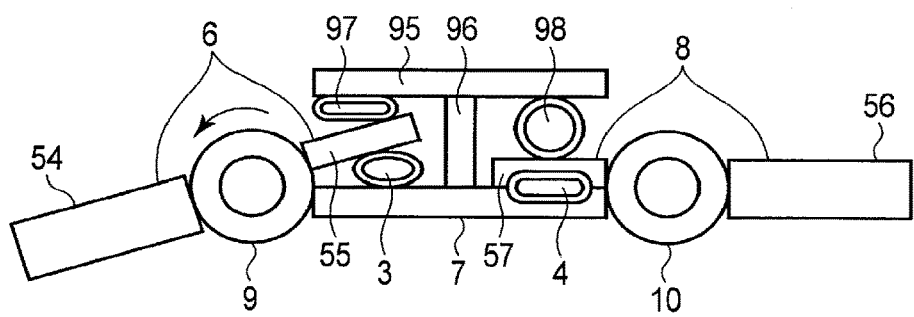
F I G. 19B
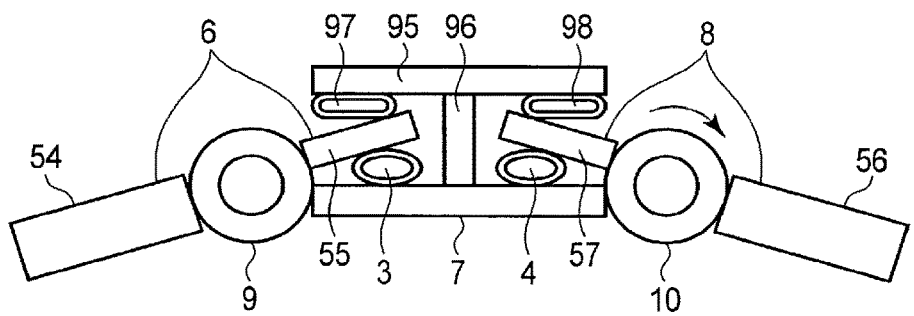
F I G. 19C

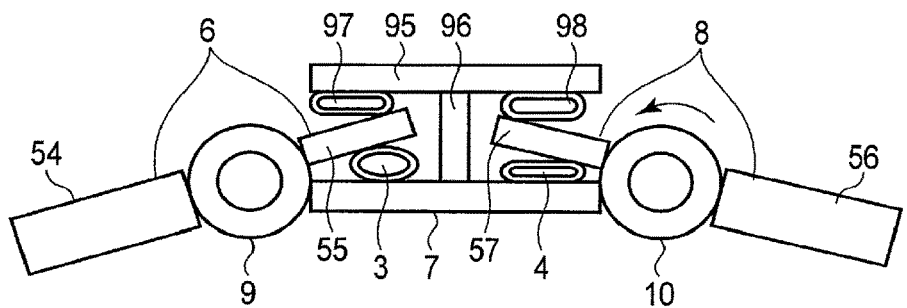
F I G. 19D
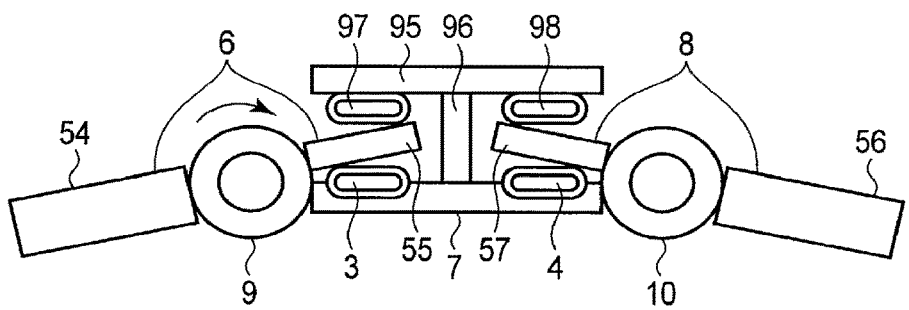
F I G. 19E
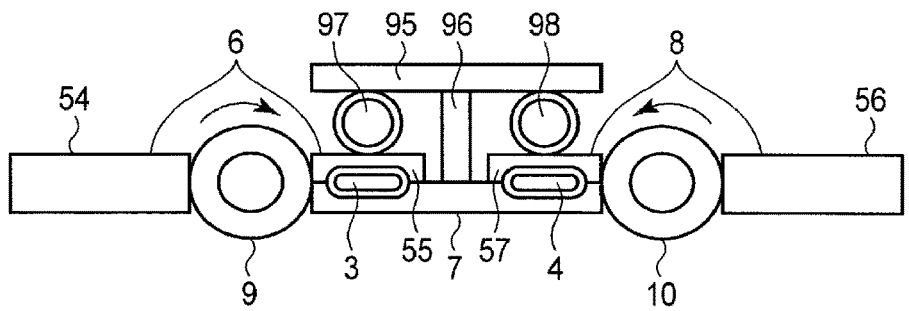
F I G. 19F

DRIVING APPARATUS

CROSS-REFERENCE TO RELATED APPLICATION

This application is based upon and claims the benefit of priority from Japanese Patent Application No. 2015-255111, filed Dec. 25, 2015, the entire contents of which is incorporated herein by reference.

FIELD

Embodiments described herein relates generally to a driving apparatus.

BACKGROUND

In logistic or manufacturing fields, in order to hold an object and move it to a desired place, a driving apparatus installed on a tip of a manipulator or the like is employed. The driving apparatus is preferably lightweight, wire-saving, compact, and capable of outputting high power.

For this purpose, as an actuator used in a joint or the like of the driving apparatus, a hydraulic actuator energized by fluid is usually employed rather than an electromagnetic actuator.

As the hydraulic actuator, a McKibben type actuator used as an artificial muscle of a robot is known in the art. The McKibben type actuator is structured by a tubular expandable member and a sheath which covers the expandable member. The McKibben type actuator obtains a necessary actuating force by contracting the expandable member in its longitudinal direction and expanding the expandable member in its radial direction. However, since the expandable member of the McKibben type actuator repeats contraction and expansion, the expandable member may be damaged by rubbing with the sheath. In addition, since the expandable member of the McKibben type actuator is contracted in its longitudinal direction and is expanded in its radial direction, there are a lot of moving parts. Therefore, it is difficult to predict a deformation transition of the expandable member and to mechanically strongly fix it to the driving apparatus under considering its deformation transition in advance. For this reason, in order to produce a driving apparatus capable of holding an object to fit a shape of the object, a structure of the driving apparatus becomes complicated.

BRIEF DESCRIPTION OF THE DRAWINGS

FIG. 4 is a plan view of the driving apparatus according to the first embodiment.

FIG. 5A is a view showing a motion of the driving apparatus according to the first embodiment in a step S1.

FIG. 5B is a view showing a motion of the driving apparatus according to the first embodiment in a step S2.

FIG. 6B is a view showing a motion of the driving apparatus according to the first embodiment, in which connecting positions of links to joints are different from those of FIG. 6A.

FIG. 8 is a plan view of a first part of the driving-apparatus assembly of FIG. 7.

FIG. 19A is a view showing a motion of the driving apparatus according to the fourth embodiment in a step 1.

FIG. 19B is a view showing a motion of the driving apparatus according to the fourth embodiment in a step 2.

FIG. 19C is a view showing a motion of the driving apparatus according to the fourth embodiment in a step 3.

FIG. 19D is a view showing a motion of the driving apparatus according to the fourth embodiment in a step 4.

FIG. 19E is a view showing a motion of the driving apparatus according to the fourth embodiment in a step 5.

FIG. 19F is a view showing a motion of the driving apparatus according to the fourth embodiment in a step 6.

DETAILED DESCRIPTION

Figure 1:
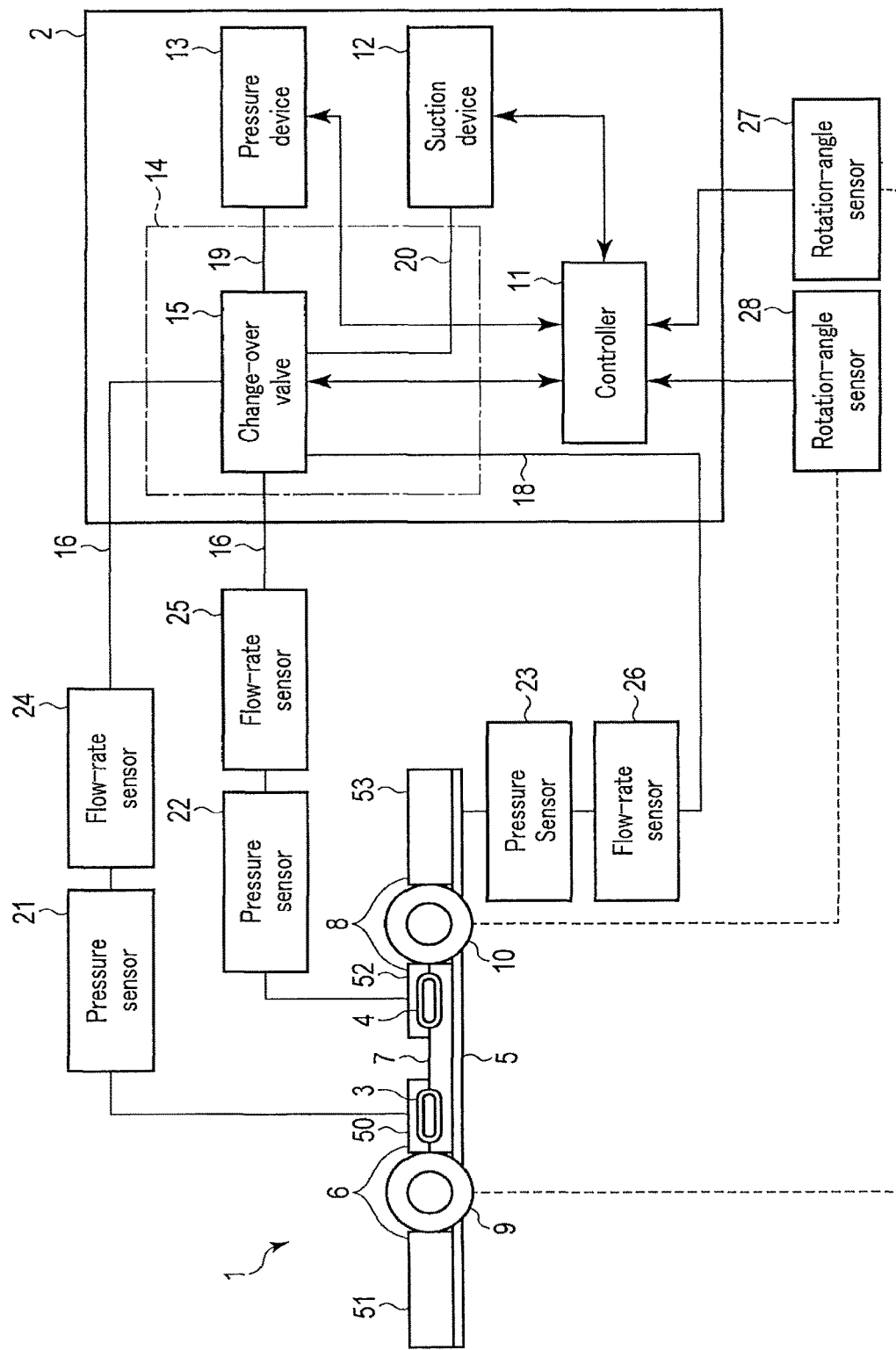
FIG. 1 is a view showing a structure of a driving apparatus and pressure source according to a first embodiment.

A driving apparatus according to one embodiment includes a joint, a first support member connected to the joint and a second support member connected to the joint. In the driving apparatus according to one embodiment, a first elastic body which is inflatable or deflatable is provided along the joint, the first support member and the second support member, a support provided with a first end portion and a second end portion opposite to the first end portion is placed between the first support member and the first elastic body, and the first end portion is connected to the joint. Further, a second elastic body which is inflatable or deflatable is inserted between the support and the first support member.

A driving apparatus according to another embodiment includes a support having a first end portion and a second end portion opposite to the first end portion, a first joint connected to the first end portion and a second joint connected to the second end portion. The driving apparatus according to the other embodiment further includes a first support member placed between the first joint and the second joint and connected to the first joint, a second support member connected to the first joint and cooperating with the first support member to sandwich the first joint, a third support member placed between the first joint and the second joint and connected to the second joint, and a fourth support member connected to the second joint and cooperating with the third support member to sandwich the second joint. In the driving apparatus according to the other embodiment, a first elastic body which is inflatable or deflatable is provided along the second support member, the first joint, the support, the second joint and the fourth support member, a second elastic body which is inflatable or deflatable is inserted between the first support member and the support, and a third elastic body which is inflatable or deflatable is inserted between the third support member and the support.

A driving apparatus according to more further embodiment includes a first support having a first surface and a first end portion, a second support having a second surface which faces the first surface of the first support, a connecting portion connecting the first surface of the first support with the second surface of the second support and a joint connected to the first end portion of the first support. In the driving apparatus according to the more further embodiment, a first support member is placed between the joint and the connecting portion and between the first and second supports and is connected to the joint, a first elastic body is inserted between the first support member and the first support, a second elastic body is inserted between the first support member and the second support, and a second support member is connected to the joint and cooperates with the first support member to sandwich the joint.

Various embodiments will be described with reference to the accompanying drawings, in which same reference numerals denote same elements or parts. Note that the drawings are just schematically illustrated only in concept, and a relationship between a thickness and a width in each element or part, scales of sizes thereof or the like are not necessarily the same as those of a real element or part. Furthermore, even the same element or part may have different dimensions or scales depending on the drawings.

First Embodiment

FIG. 1 shows a driving apparatus 1 and a pressure source 2 connected thereto.

The driving apparatus 1 includes a flat tube (second elastic body) 3, a flat tube (third elastic body) 4, a flat tube (first elastic body) 5, a link 6, a link (support) 7, a link 8, a joint (first joint) 9, and a joint (second joint) 10.

The pressure source 2 includes a controller (control portion) 11, a suction device 12, a pressure device 13 and an electromagnetic valve 14. The electromagnetic valve 14 is provided with a change-over valve 15.

The link 6 includes first and second support members 50 and 51 and the joint 9 interposed therebetween. The link 8 includes third and fourth support members 52 and 53 and the joint 10 interposed therebetween.

The flat tube 3 is interposed between the first support member 50 and the link 7. The flat tube 4 is interposed between the link 7 and the third support member 52. The flat tube 5 is disposed along the second support member 51, the link 7, the fourth support member 53, the joint 9 and the joint 10. Each of the flat tubes 3, 4 and 5 is provided with a flow passage where a fluid flows. The fluid can pass through the flow passage of each of the flat tubes 3, 4 and 5. Each of the flat tubes 3, 4 and 5 can be inflated or deflated by changing an internal pressure of each of the flat tubes 3, 4 and 5 depending on an amount of the internal fluid of each of the flat tubes 3, 4 and 5. The fluid may be either a liquid or a gas.

The link 7 has a first end portion and a second end portion opposite to the first end portion. The joint 9 is connected to the first end portion of the link 7. The joint 10 is connected to the second end portion of the link 7.

The first support member 50 is placed between the joint 9 and the joint 10 and is connected to the joint 9. The first support member 50 is positioned to adjoin with the flat tube 3. The third support member 52 is placed between the joint 9 and the joint 10 and is connected to the joint 10. The third support member 52 is positioned to adjoin with the flat tube 4. The first and second support members 50 and 51 may also be collectively referred to as the link 6. The third and fourth support members 52 and 53 may also be collectively referred to as the link 8.

In the driving apparatus. 1 of FIG. 1, the flat tubes 3 and 4 are shown in their cross-sections, and the flat tube 5 is shown in its side view. The links 6 and 7 are pivoted around the joint 9. The links 7 and 8 are pivoted around the joint 10.

The joint 9 is provided with a rotation-angle sensor 27 for detecting an angle of the joint 9. The joint 10 is provided with a rotation-angle sensor 28 for detecting an angle of the joint 10. Each of the rotation-angle sensors 27 and 28 is connected to the controller 11. Each of the rotation-angle sensors 27 and 28 will be referred to as a third sensor.

The flat tubes 3 and 4 are connected to the change-over valve 15 provided in the pressure source 2 through a tube 16. Although the flat tubes 3 and 4 are connected to each other through the tube 16, the flat tubes 3 and 4 may also be directly connected to each other.

The flat tube 5 is connected to the change-over valve 15 provided in the pressure source 2 through a tube 18. Another end of the flat tube 5 which is not connected to the tube 18 is closed.

A pressure sensor 21 and an flow-rate sensor 24 are connected to the tube 16 connected to the flat tube 3. A pressure sensor 22 and a flow-rate sensor 25 are connected to the tube 16 connected to the flat tube 4. A pressure sensor 23 and a flow-rate sensor 26 are connected to the tube 18. Each of the pressure sensors 21, 22 and 23 will be referred to as a first sensor. Each of the flow-rate sensors 24, 25 and 26 will be referred to as a second sensor.

The change-over valve 15 is connected to the pressure device 13 through a tube 19. The change-over valve 15 is connected to the suction device 12 through a tube 20.

The controller 11 controls the change-over valve 15, the pressure device 13 and the suction device 12. When a fluid is supplied to the flat tubes 3, 4, and 5, the controller 11 controls the change-over valve 15 such that at least one of the tube 16 connected to the flat tube 3 and the tube 18 is connected to the tube 19. The controller 11 controls the pressure device 13 to supply the fluid to at least one of the flat tubes 3, 4 and 5. When the fluid is suctioned from the flat tubes 3, 4 and 5, the controller 11 controls the change-over valve 15 such that at least one of the tube 16 connected to the flat tube 4 and the tube 18 is connected to the tube 20. The controller 11 controls the suction device 12 to suction the fluid from at least one of the flat tubes 3, 4 and 5.

A compressor may be used as the pressure device 13. In addition to the compressor, collecting air from an air pipe inside a factory may be used as the pressure device 13. A pump may be used as the suction device 12. In addition to the pump, generating a negative pressure by a combination of a pressure device and a vacuum generator may be used as the suction device 12.

The tubes 16, 18, 19 and 20 are preferably not to be inflated and bursted by pressurization and not to be crushed by sucking.

The fluid supplied to the flat tubes 3, 4 and 5 may be an inert gas, water, oil or the like. The flat tubes 3, 4 and 5 may be formed of an elastic member being inflatable and deflatable and restricted unidirectionally its deformation direction.

As each of the rotation-angle sensors 27 and 28, an encoder, a potentiometer or the like is used.

As the pressure sensors 21, 22 and 23 detect internal fluid pressures of the flat tubes 3, 4 and 5, respectively, the controller 11 can control whether inflating the flat tubes 3, 4 and 5, respectively, by supplying the fluid or deflating them, respectively, by sucking the fluid.

As the pressure sensors 21, 22 and 23 detect internal fluid pressures of the flat tubes 3, 4 and 5, respectively, the controller 11 determines whether or not the flat tubes 3, 4 and 5, respectively, are damaged.

As the flow-rate sensors 24, 25 and 26 detect flow rates of the fluid in the flat tubes 3, 4 and 5, respectively, the controller 11 can control whether inflating the flat tubes 3, 4 and 5, respectively, by supplying the fluid or deflating them, respectively, by sucking the fluid.

As the flow-rate sensors 24, 25, and 26 detect flow rates of the flat tubes 3, 4, and 5, respectively, the controller 11 estimates deformation rates of the flat tubes 3, 4, and 5, respectively.

Figure 2A:
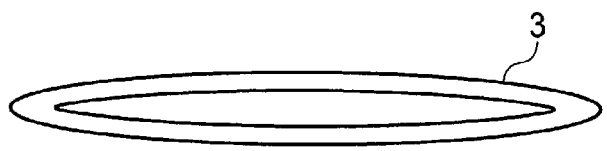
FIG. 2A is a view showing a cross section of a flat tube of the driving apparatus according to the first embodiment in a flattening state.
Figure 2B:
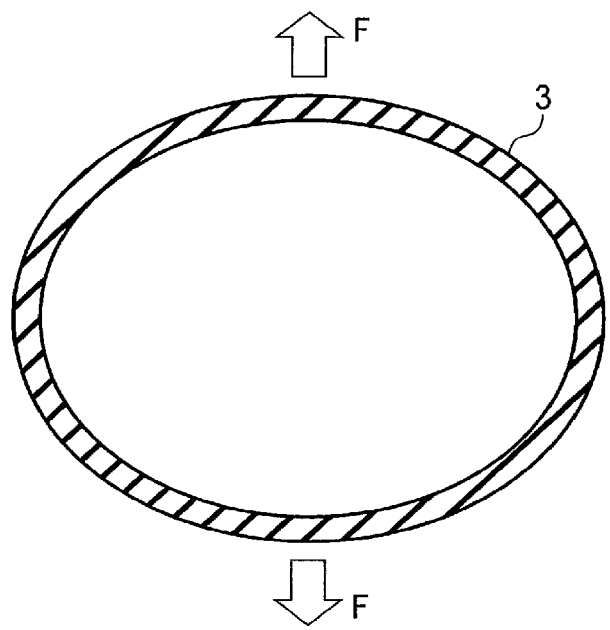
FIG. 2B is a view showing the cross section of the flat tube of the driving apparatus according to the first embodiment in an inflated state (unflattening state).

FIG. 2A shows a cross section of the flat tube 3, and FIG. 2B shows a cross section of the inflated flat tube 3.

The flat tube 3 shown in FIG. 2A can be obtained, for example, by pressing a thermoplastic tube having a diameter of 12 mm while it is heated to make it being formed as a flat cross-sectional shape and by cooling it in this state. As a material of the thermoplastic tube, urethane or the like may be used.

When no fluid is supplied to the flat tube 3, the cross section of the flat tube 3 is a flattening state. In FIG. 2B, the flat tube 3 is inflated as the fluid is supplied to the flat tube 3. In the inflated flat tube 3, an outer circumferential length of the inflated flat tube 3 in its cross section is not changed and a force F is generated in a direction perpendicular to a longitudinal direction of the cross section of the flat tube 3. The flat tubes 4 and 5 are similar to the flat tube 3.

Figure 3:
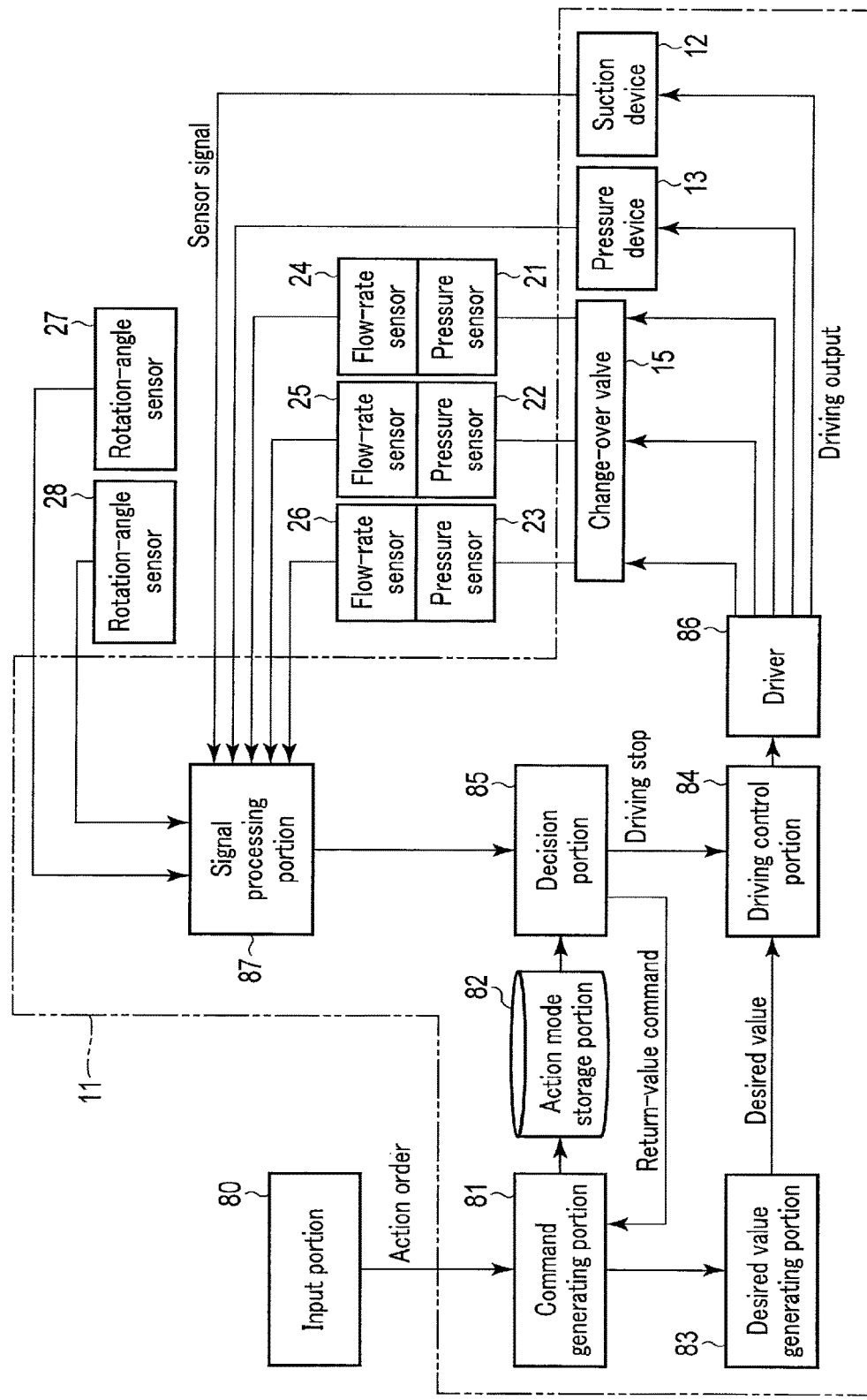
FIG. 3 is a block diagram of a controller of the driving apparatus according to the first embodiment.

FIG. 3 shows the controller 11 of FIG. 1 in more detail. The controller 11 includes a command generating portion 81, a desired value generating portion 83 for generating a desired value order, a driving control portion 84, a decision portion 85, a signal processing portion 87, an action mode storage portion 82 and a driver 86. Note that the controller 11 is also referred to as a control portion.

An input portion 80 sends an action order to the command generating portion 81. The command generating portion 81 generates an operation sequence necessary for each work process as an operation command in response to the action order.

The command generating portion 81 sends action mode information corresponding to the operation command to be executed to the action mode storage portion 82. The action mode storage portion 82 stores the action mode information.

The action mode storage portion 82 also stores attribute data such as a shape, a weight and flexibility of an object to be held by the driving apparatus 1. The action mode may include, for example, an action mode for stopping the operation of the change-over valve 15, an action mode for holding internal pressures of the flat tubes 3, 4 and 5, and the like.

The action order of the input portion 80 is an instruction relating a series of operations of the driving apparatus 1 and is stored in a form of, for example, a program. The action order may be instructed from an operator by touching an instruction command displayed on a panel of the input portion 80 or may be instructed from operator's voice.

The input portion 80 may be integrally with the driving apparatus 1 or may be configured to transmit an instruction to the driving apparatus 1 in a wired or wireless manner.

The desired value generating portion 83 receives an instruction of the operation command for the change-over valve 15 from the command generating portion 81. The desired value generating portion 83 calculates a desired value of the change-over valve 15 and generates a desired value order for an operation of the change-over valve 15.

The driving control portion 84 receives the desired value order of the change-over valve 15 from the desired value generating portion 83 and generates a driving instruction for driving the change-over valve 15 in response to the desired value order.

The driver 86 receives the driving instruction of the change-over valve 15 from the driving control portion 84 to generate a driving output for the change-over valve 15.

The change-over valve 15 receives the driving output from the driver 86 and adjusts an amount of a fluid to be supplied. As the change-over valve 15, for example, a combination of an electromagnetic solenoid and an isolation wall member or a combination of an electromagnetic rotary motor and an isolation wall member may be used.

The pressure sensors 21, 22 and 23 sense the operation of the change-over valve 15 and generate sensor signals. The sensor signal is, for example, a voltage value.

The flow-rate sensors 24, 25 and 26 sense the operation of the change-over valve 15 and generate sensor signals. The sensor signal is, for example, a voltage value.

The rotation-angle sensors 27 and 28 sense the operations of the joints 9 and 10 and generate sensor signals. The sensor signal is, for example, a voltage value.

The signal processing portion 87 receives each sensor signal and performs a signal processing for each sensor signal, such as a signal amplification or an analog/digital conversion.

The decision portion 85 receives a converted sensor signal from the signal processing portion 87. The decision portion 85 decides whether a fluid supply amount is controlled or not and whether an object is held or not depending on the sensor signals. The decision portion 85 receives the action mode information from the command generating portion 81 depending on a result of the decision. The decision portion 85 extracts an operation of the change-over valve 15 corresponding to the action mode information from the action mode storage portion 82. The decision portion 85 generates a command for stopping or switching a driving of the change-over valve 15, and the like. The decision portion 85 generates a return-value command for correcting a desired value to the command generating portion 81.

In response to the return-value command, the command generating portion 81 can execute a corresponding processing operation suitable for a current action and secure a reliability and a certainty of the action of the driving apparatus 1.

FIG. 4 is a plan view of the driving apparatus 1.

The flat tubes 3 and 4 are connected to each other in series through the tube 16. Both ends of the tube 16 are connected to the pressure source 2. One end of the tube 18 is connected to the flat tube 5 and the other end of the tube 18 is connected to the pressure source 2. Note that the both ends of the tube 16 may also be respectively connected to different pressure sources. The tube 18 may be connected to a pressure source different from that connected to the tube 16.

FIGS. 5A to 5F show steps S1 to S6 of motions of the driving apparatus 1 around the joints 9 and 10.

While the fluid of the flat tube 5 is suctioned and the flat tube 5 is deflated and no fluid is supplied to the flat tubes 3 and 4 (FIG. 5A: step S1), the fluid is supplied to the flat tube 3 and the flat tube 3 is inflated. The flat tube 3 presses the first support member 50 so that the first support member 50 is pivoted around the joint 9 in a direction in which the first support member 50 moves away from the link 7 (FIG. 5B: step S2).

Figure 5C:
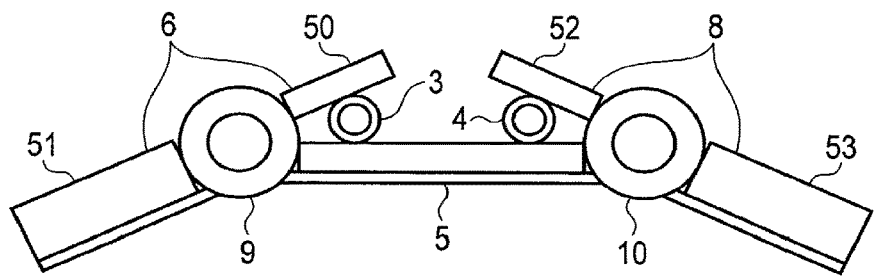
FIG. 5C is a view showing a motion of the driving apparatus according to the first embodiment in a step S3.

Since the flat tubes 3 and 4 are connected to each other in series through the tube 16, the fluid is supplied to the flat tube 4 to inflate the flat tube 4 after inflation of the flat tube 3. The flat tube 4 presses the third support member 52 so that the third support member 52 is pivoted around the joint 10 in a direction in which the third support member 52 moves away from the link 7. Therefore, the links 6 and 8 are significantly bent by the joints 9 and 10. By changing a sequence of supplying the fluid to the flat tubes 3 and 4, the sequence of inflating the flat tubes 3 and 4 may also be changed (FIG. 5C: step S3).

Figure 5D:
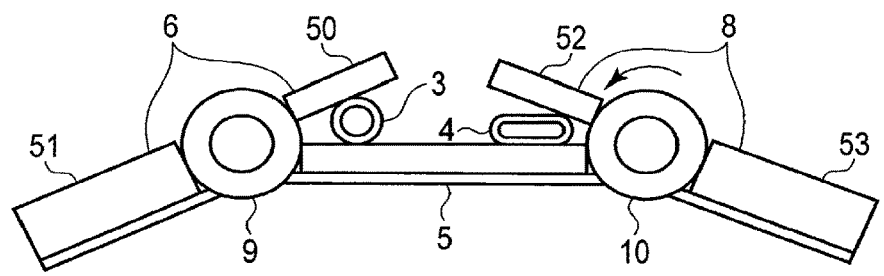
FIG. 5D is a view showing a motion of the driving apparatus according to the first embodiment in a step S4.

When the fluid is suctioned from the flat tube 3, the flat tube 4 is initially deflated because the flat tubes 3 and 4 are connected to each other in series through the tube 16. When the flat tube 4 is deflated, the flat tube 4 does not press the third support member 52. As the flat tube 4 is more deflated, the third support member 52 can be more pivoted around the joint 10 in a direction in which the third support member 52 approaches the link 7 (FIG. 5D: step S4).

Figure 5E:
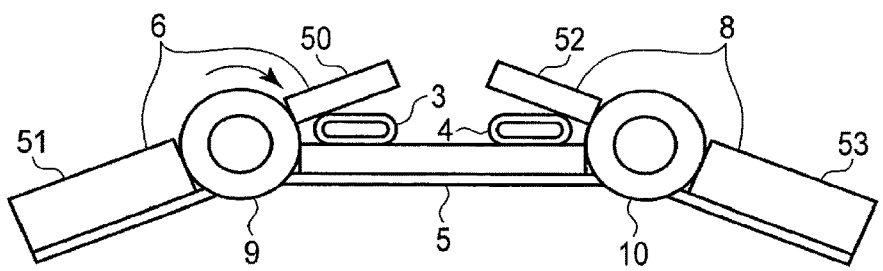
FIG. 5E is a view showing a motion of the driving apparatus according to the first embodiment in a step S5.

After the flat tube 4 is deflated, the fluid contained in the flat tube 3 is also sucked so that the flat tube 3 is deflated and the flat tube 3 does not press the first support member 50. The flat tube 3 is more deflated, the first support member 50 can be more pivoted around the joint 9 in a direction in which the first support member 50 approaches the link 7. In this time, by changing a sequence of sucking the fluid contained in the flat tubes 3 and 4, a sequence of deflating the flat tubes 3 and 4 may also be changed (FIG. 5E: step S5).

Figure 5F:
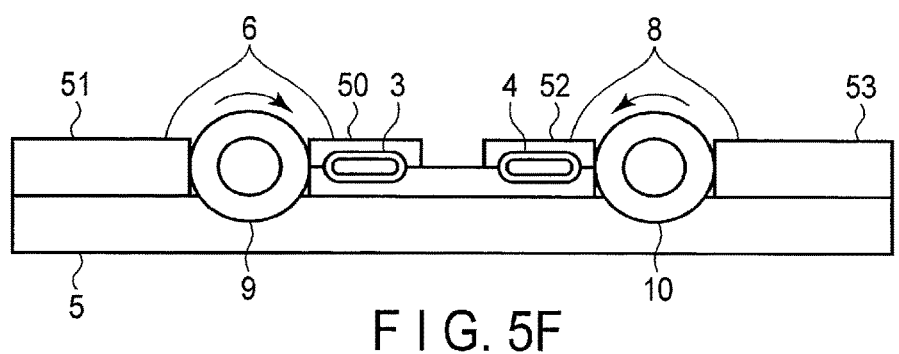
FIG. 5F is a view showing a motion of in the driving apparatus according to the first embodiment in a step S6.

Then, the fluid is supplied to the flat tube 5 and the flat tube 5 is inflated. The inflated flat tube 5 presses the second and fourth support members 51 and 53 from their lower side so that the first support member 50 is pivoted around the joint 9 in a direction in which the first support member 50 approaches the link 7 and the third support member 52 is pivoted around the joint 10 in a direction in which the third support member 52 approach the link 7. The links 6 and 8 of the driving apparatus 1 become in a straight situation (FIG. 5F: step S6).

Figure 6A:
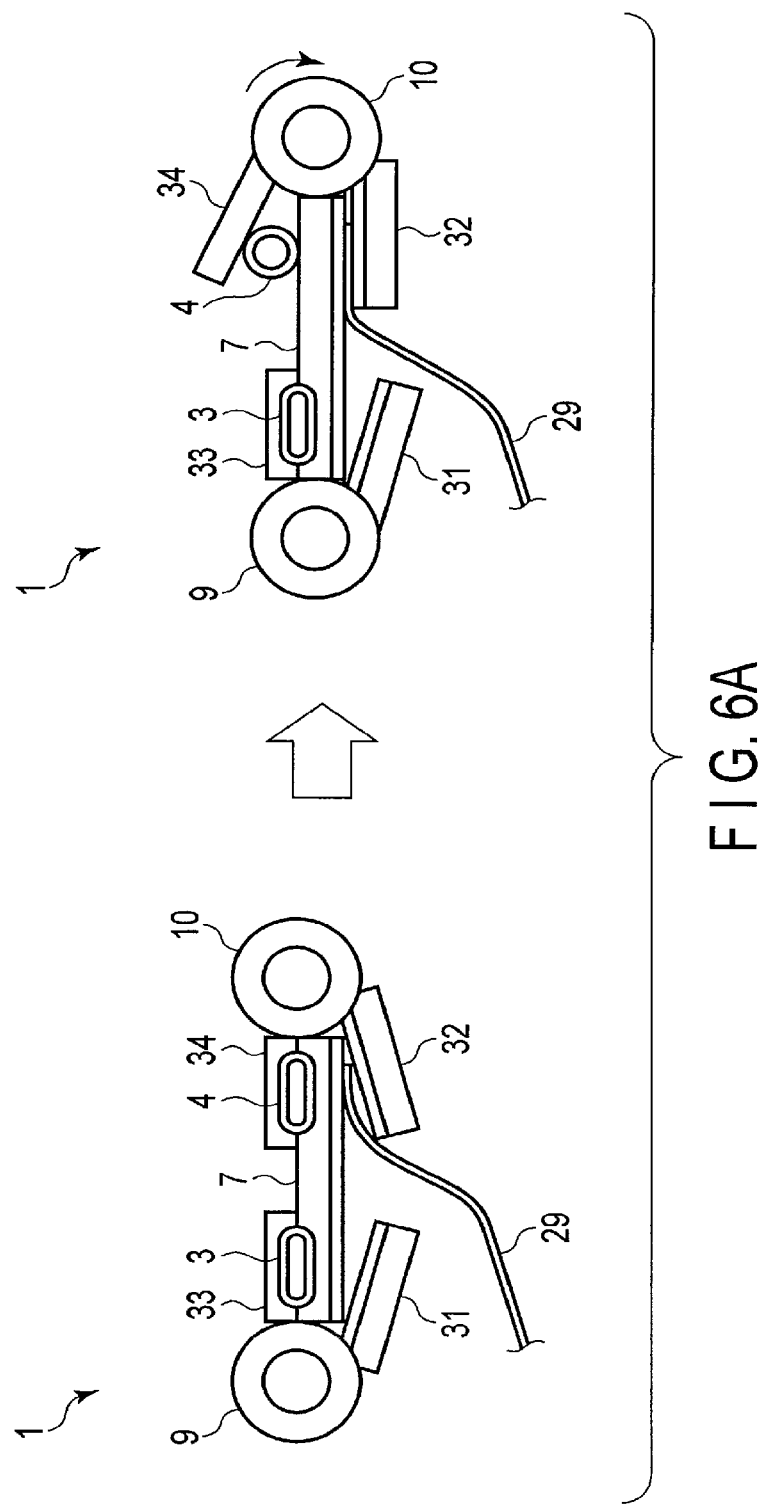
FIG. 6A is a view showing a motion of the driving apparatus according to the first embodiment.

FIGS. 6A and 6B shown the driving apparatuses 1 in which positions of the link connected to the joint 9 and the link connected to the joint 10 are changed.

In FIG. 6A, a link (second support member) 31 and a link (fourth support member) 32 are placed at positions close to a side of the link 7 where the flat tube 5 is provided. The link 31 is connected to the joint 9. The link 32 is connected to the joint 10. A link (first support member) 33 is positioned between the joints 9 and 10 and is connected to the joint 9. A link (third support member) 34 is positioned between the joints 9 and 10 and is connected to the joint 10.

As shown in FIG. 6A, when the fluid is supplied to the flat tube 4, the flat tube 4 is inflated. The flat tube 4 presses the link 34 and the link 34 is pivoted around the joint 10 in a direction in which the link 34 moves away from the link 7. When the joint 10 is pivoted, the link 32 is also pivoted. When the link 32 is pivoted, the link 32 contacts a surface of the link 7 on which the flat tube 5 is provided. The link 32 can hold a small or thin object such as an object 29.

In FIG. 6B, the link 31 is connected to the joint 9 at a position where the link 31 contacts the link 33. The link 32 is connected to the joint 10 at a position where the link 32 contacts the link 34.

As shown in FIG. 6B, when the fluid is supplied to the flat tube 4, the flat tube 4 is inflated. The flat tube 4 presses the link 34 and the link 34 is pivoted around the joint 10 in a direction in which the link 34 moves away from the link 7. When the joint 10 is pivoted, the link 32 is also pivoted.

When the flat tube 4 is inflated after the driving apparatus 1 is inserted into a box-like object 30 having an angular C-shaped cross section with its one face being opened, the link 32 contacts an inner surface of the object 30. In this time, the joint 10 and the link 7 also contact the inner surface of the object 30. The driving apparatus 1 can hold the object 30.

The flat tubes 3, 4 and 5 are small in size and light in weight. Since they are deformed only in their radial direction, each of their deformation transitions can be easily predicted. Therefore, they can be mechanically strongly fixed to the driving apparatus 1 under consideration of their deformation transitions in advance. Further, a plurality of flat tubes 3 and 4 may be laid in a multi-stage to increase pivot ranges of the links 33 and 34. The flat tubes 3 and 4 may be connected in parallel through the tube 16. In this case, the fluid simultaneously flows in the flat tubes 3 and 4 so that the links 33 and 34 of the driving apparatus 1 are pivoted simultaneously.

Since the driving apparatus 1 has a symmetrical structure in its right and left directions, the driving apparatus 1 can be halved and only one half can be driven. For example, in a case of the driving apparatus 1 of FIGS. 6A and 6B, only a half part structured by the link 7, the flat tube 3, the link 31, the link 33, the joint 9 and the flat tube 5 can be driven to hold an object. The flat tubes 3 and 4 may be directly connected to the change-over valve 15 included in the pressure source 2 without using the tube 16. The flat tube 5 may also be directly connected to the change-over valve 15 included in the pressure source 2 without using the tube 18. The change-over valve 15 may be operated by an air pressure.

Second Embodiment

Figure 7:
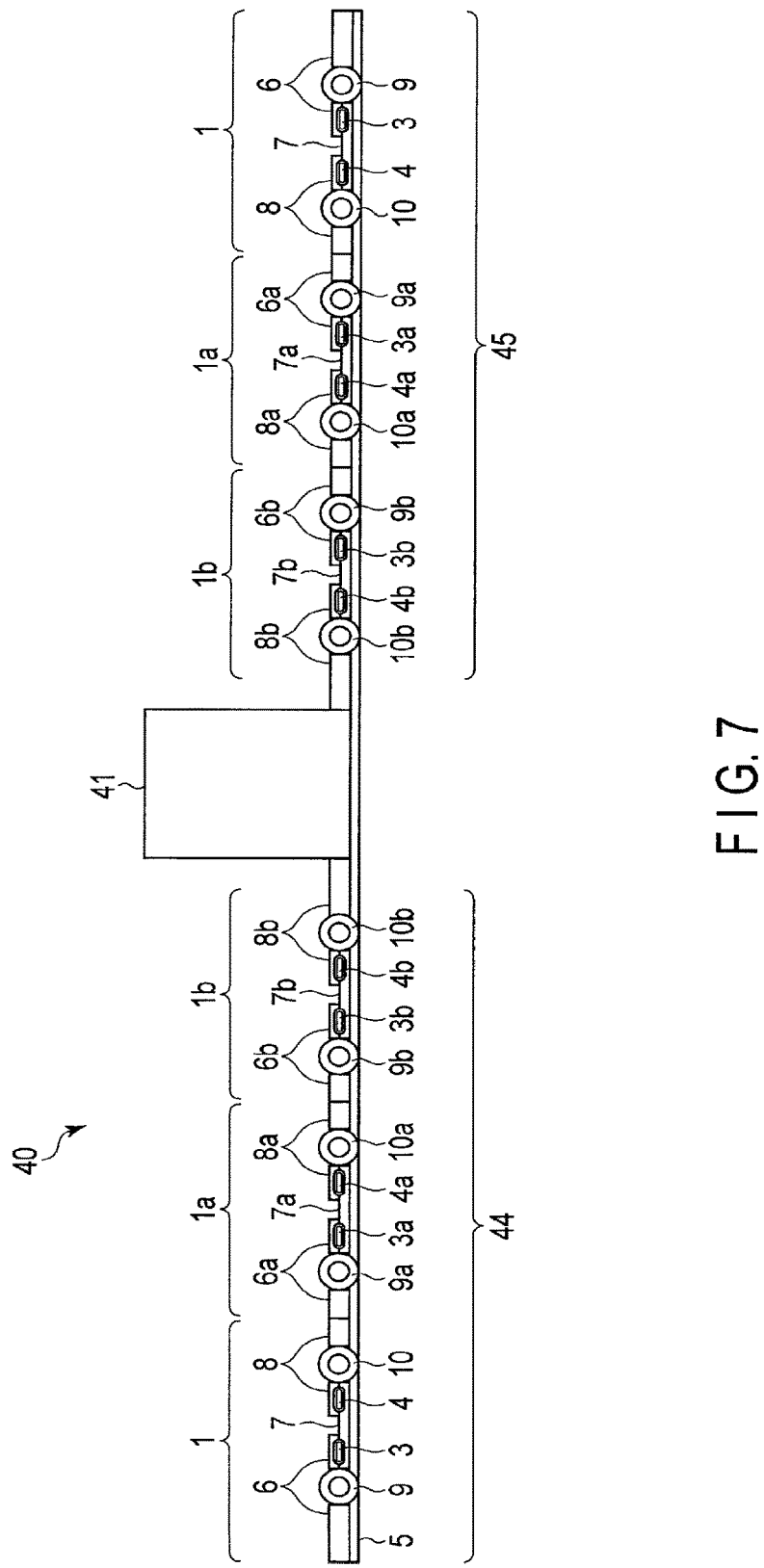
FIG. 7 is a side view of a driving-apparatus assembly according to a second embodiment.

FIG. 7 shows a driving-apparatus assembly 40 including driving apparatuses 1, 1a and 1b. In the driving-apparatus assembly 40, the driving apparatuses 1, 1a and 1b are linked with each other in each of the both sides of a base 41.

In the driving-apparatus assembly 40, one part in which one driving apparatus 1, one driving apparatus 1a and one driving apparatus 1b are linked with each other is referred to as a first portion 44, and another part in which another driving apparatus 1, another driving apparatus 1a and another driving apparatus 1b are linked with each other is referred to as a second portion 45. Each of the driving apparatuses 1a and 1b has the same structure as that of the driving apparatus 1.

The driving-apparatus assembly 40 is used with it being connected to a manipulator or the like of a robot. The flat tube 5 is used through each of the first and second portions 44 and 45.

Although the first and second portions 44 and 45 are connected to a base 41 in FIG. 7, another portion having the same structure as that of the first portion 44 may be further connected to the base 41.

FIG. 8 shows a plan view of the first portion 44 in which the driving apparatuses 1, 1a and 1b are linked with each other.

The flat tube 3, the flat tube 4, a flat tube 3a, a flat tube 4a, a flat tube 3b and a flat tube 4b are connected with each other in series through the tube 16. Both ends of the tube 16 are connected to the pressure source 2. One end of the tube 18 is connected to the flat tube 5 and another end of the tube 18 is connected to the pressure source 2. The other end of the flat tube 5 that is not connected to the tube 18 is closed. Both ends of the tube 16 may be connected to different pressure sources. The tube 18 may be connected to a pressure source different from that connected to the tube 16.

Figure 9:
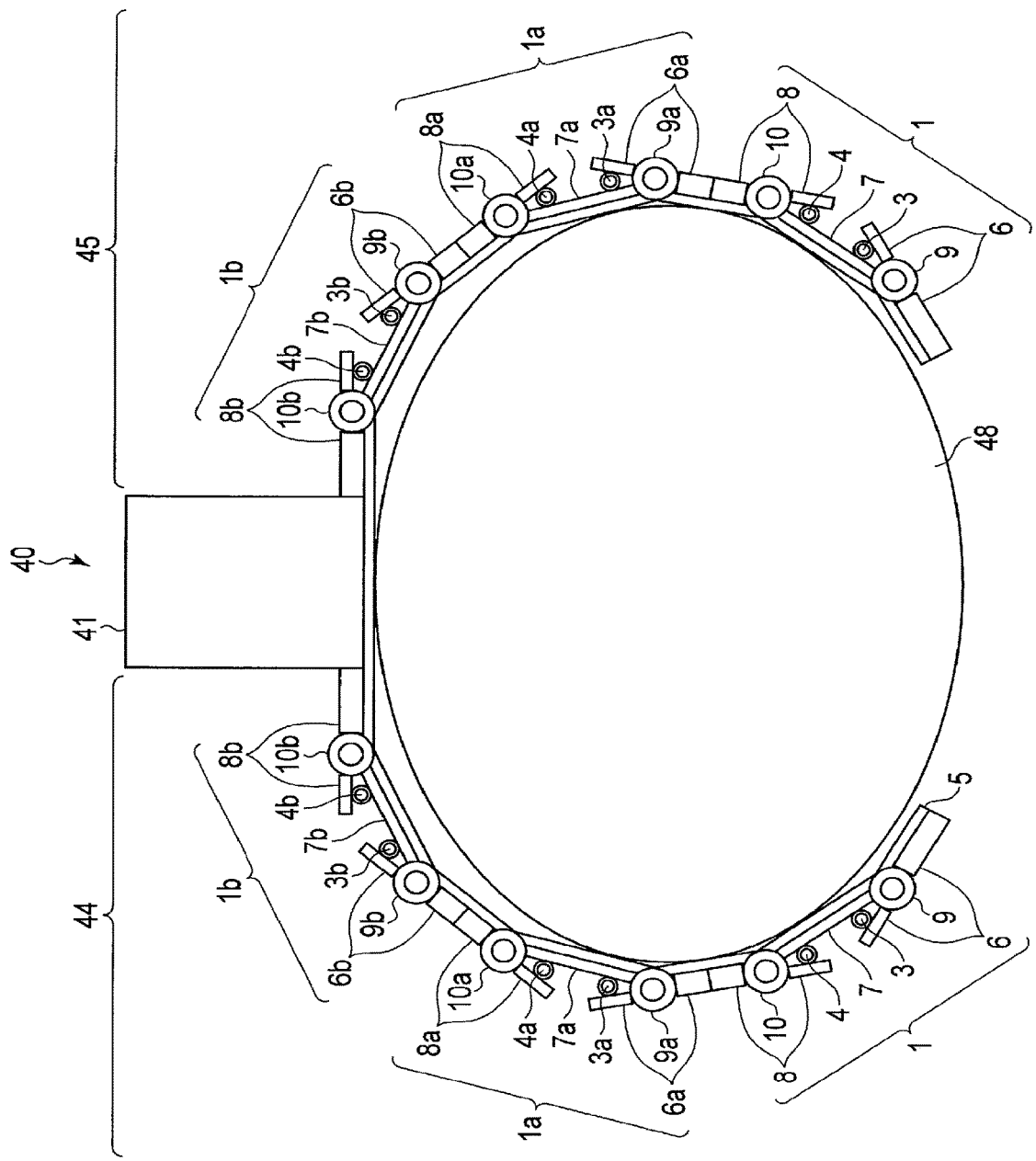
FIG. 9 is a side view showing an operation of the driving-apparatus assembly according to the second embodiment.

FIG. 9 shows a situation in which the driving-apparatus assembly 40 holds a spherical object 48.

A movement of the first portion 44 for making the driving-apparatus assembly 40 hold the object 48 will be described. A fluid is supplied to the flat tube 4b placed close to the base 41 through the tube 16, the flat tube 4b is inflated. The inflated flat tube 4b presses the link 8b, and the link 8b pivots around a joint 10b. After the flat tube 4b is inflated, the flat tubes 3b, 4a, 3a, 4 and 3 are inflated sequentially. When the flat tube 3b is inflated, the flat tube 3b presses the link 6b and the link 6b pivots around a joint 9b. When the flat tube 4a is inflated, the flat tube 4a presses the link 8a and the link 8a pivots around a joint 10a. When the flat tube 3a is inflated, the flat tube 3a presses the link 6a and the link 6a pivots around a joint 9a. When the flat tube 4 is inflated, the flat tube 4 presses the link 8 and the link 8 pivots around the joint 10. When the flat tube 3 is inflated, the flat tube 3 presses the link 6 and the link 6 pivots around the joint 9.

In the first portion 44, the driving apparatus 1b is initially bent. After the driving apparatus 1b is bent, the driving apparatuses 1a and 1 are bent sequentially in this order and the first portion 44 contacts the object 48 to be along with a shape of the object 48. In the second portion 44, similar to the first portion 44, the driving apparatuses 1b, 1a and 1 are bent sequentially in this order and the second portion 45 contacts the object 48 to be along with the shape of the object 48.

Since the first and second portions 44 and 45 contact the object 48 to be along with the shape of the object 48, the driving-apparatus assembly 40 can hold the object 48. While the driving-apparatus assembly 40 holds the object 48, the driving-apparatus assembly 40 may be moved by the manipulator to transport the object 48 to an arbitrary position.

A movement of the driving-apparatus assembly 40 to release the object 48 will be described.

In the first portion 44, the controller 11 controls the suction device 12 to suction the fluid from the flat tube 4b through the tube 16. Since the flat tubes 3, 4, 3a, 4a, 3b and 4b are connected to each other in series through the tube 16, the flat tubes 3, 4, 3a, 4a, 3b and 4b are deflated sequentially in this order. Cross sections of the flat tubes 3, 4, 3a, 4a, 3b and 4b are flattened sequentially in this order.

Similar to the first portion 44, in the second portion 45, the flat tubes 3, 4, 3a, 4a, 3b and 4b are deflated sequentially in this order. The cross sections of the flat tubes 3, 4, 3a, 4a, 3b and 4b are flattened sequentially in this order.

The driving-apparatus assembly 40 releases the object 48 to place the object 48 in an arbitrary position.

The controller 11 controls the pressure device 13 to supply the fluid to the flat tube 5 through the tube 18, and the flat tube 5 inflates. In the first portion 44, the inflated flat tube 5 presses each of the link 6, the link 7, the link 8, a link 6a, a link 7a, a link 8a, a link 6b, a link 7b and a link 8b. Each of the links 6, 7, 8, 6a, 7a, 8a, 6b, 7b and 8b pivots to return the first portion 44 in the straight situation.

In the second portion 45, the inflated flat tube 5 presses each of the links 6, 7, 8, 6a, 7a, 8a, 6b, 7b and 8b. Each of the links 6, 7, 8, 6a, 7a, 8a, 6b, 7b and 8b pivots to return the second portion 45 in the straight situation.

Figure 10:
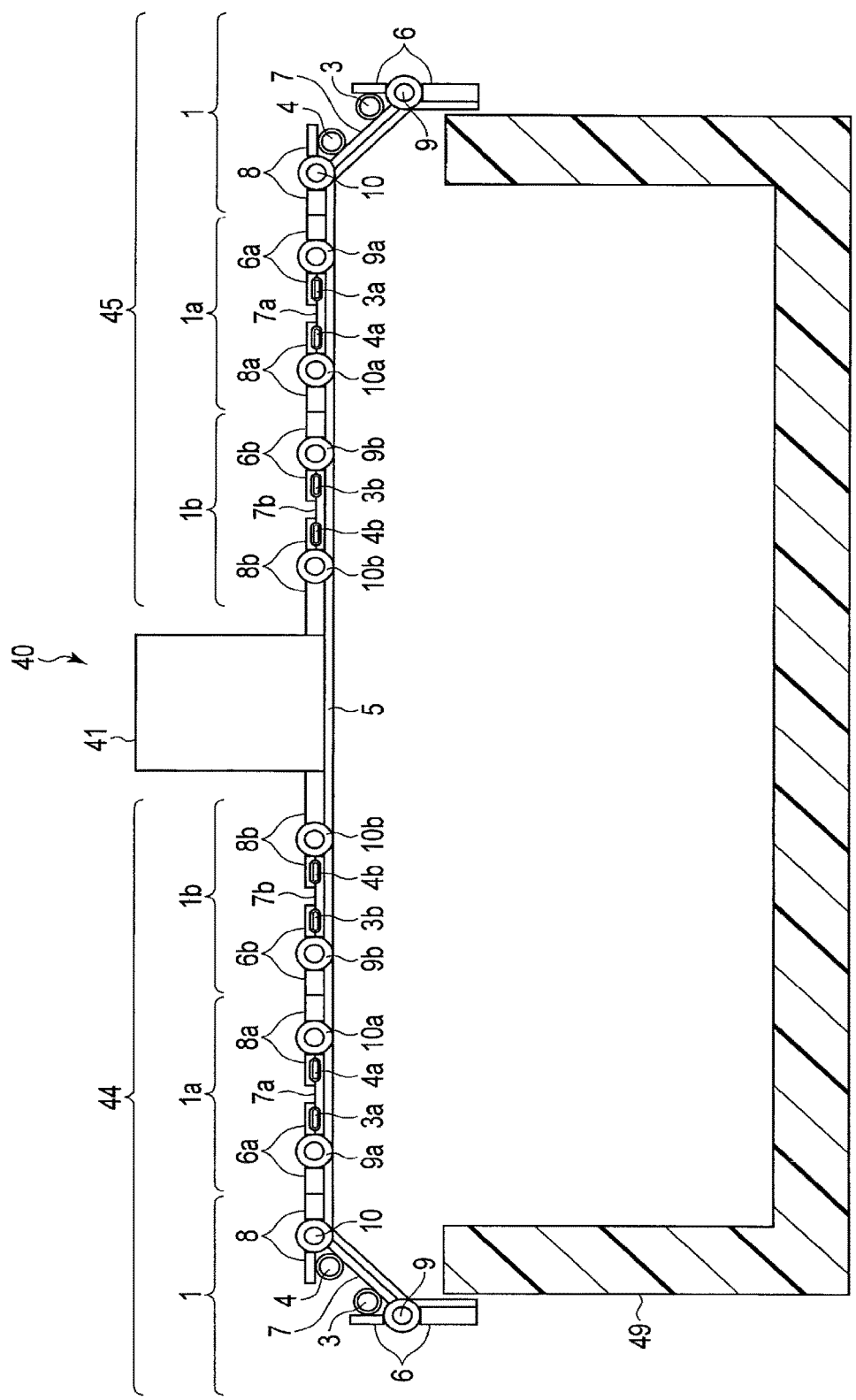
FIG. 10 is a side view showing a situation in which the driving-apparatus assembly according to the second embodiment holds a box-shaped object.

FIG. 10 shows a situation in which the driving-apparatus assembly 40 holds a box-shaped object 49.

A movement of the first portion 44 for making the driving-apparatus assembly 40 hold the object 48 will be described. Unlike the case of FIG. 9, the fluid is firstly supplied to the flat tube 3 placed in a tip of the driving apparatus 1. When the fluid is supplied to the flat tube 3 through the tube 16, the flat tube 3 is inflated. The flat tube 3 presses the links 6 and 7, and the link 6 pivots around the joint 9. Subsequent to the flat tube 3, the flat tube 4 is inflated. When the flat tube 4 is inflated, the flat tube 4 presses the link 8 and the link 8 pivots around the joint 10. The driving apparatus 1 contacts the object 49. Subsequent to the flat tube 4, the fluid is supplied to the flat tubes 3a, 4a, 3b and 4b sequentially in this order. And, the driving apparatuses 1a and 1b extend along a shape of the object 49, and the driving apparatuses 1a and 1b are not bent.

Since the tube 16 are closed to the pressure device 13 of the pressure source 2, an internal pressure of each of the tube 16 and flat tubes 3, 4, 3a, 4a, 3b and 4b are maintained independently.

Similar to the first portion 44, in the second portion 45, the driving apparatus 1 contacts the object 49. Subsequent to the flat tube 3, the fluid is supplied to the flat tubes 4, 3a, 4a, 3b and 4b sequentially in this order. And, the driving apparatuses 1a and 1b extend along the shape of the object 49, and the driving apparatuses 1a and 1b are not bent.

Since the first and second portions 44 and 45 contact the object 49 to extend along the shape of the object 49, the driving-apparatus assembly 40 can grip the object 49. While the driving-apparatus assembly 40 grips the object 49, the driving-apparatus assembly 40 is moved by manipulator to transport the object 49 to an arbitrary position.

A case where the driving-apparatus assembly 40 releases the object 49 will be described.

In the first portion 44, the controller 11 controls the suction device 12 to suck the fluid from the flat tube 3 placed in the tip of the first portion 44 through the tube 16. Since the flat tubes 3, 4, 3a, 4a, 3b and 4b are connected to each other in series through the tube 16, the fluid is sucked from the flat tubes 3, 4, 3a, 4a, 3b and 4b sequentially in this order. The flat tubes 3, 4, 3a, 4a, 3b and 4b are deflated sequentially in this order, and the cross section of each of the flat tubes 3, 4, 3a, 4a, 3b and 4b is flattened.

Similar to the first portion, in the second portion 45, the fluid is sucked from the flat tubes 3, 4, 3a, 4a, 3b and 4b sequentially in this order. The flat tubes 3, 4, 3a, 4a, 3b and 4b are deflated sequentially in this order, and the cross section of each of the flat tubes 3, 4, 3a, 4a, 3b and 4b is flattened.

The driving-apparatus assembly 40 releases the object 49 to place the object 49 on an arbitrary position.

The controller 11 controls the pressure device 13 to supply the fluid to the flat tube 5 through the tube 18, and the flat tube 5 inflates. In the first portion 44, the inflated flat tube 5 presses each of the links 6, 7, 8, 6a, 7a, 8a, 6b, 7b and 8b. Each of the links 6, 7, 8, 6a, 7a, 8a, 6b, 7b and 8b pivots to return the first portion 44 in the straight situation.

At the same time that the first portion 44 becomes in the straight situation, the inflated flat tube 5 presses each of the links 6, 7, 8, 6a, 7a, 8a, 6b, 7b and 8b in the second portion 45. Each of the links 6, 7, 8, 6a, 7a, 8a, 6b, 7b and 8b pivots to return the second portion 45 in the straight situation.

Figure 11:
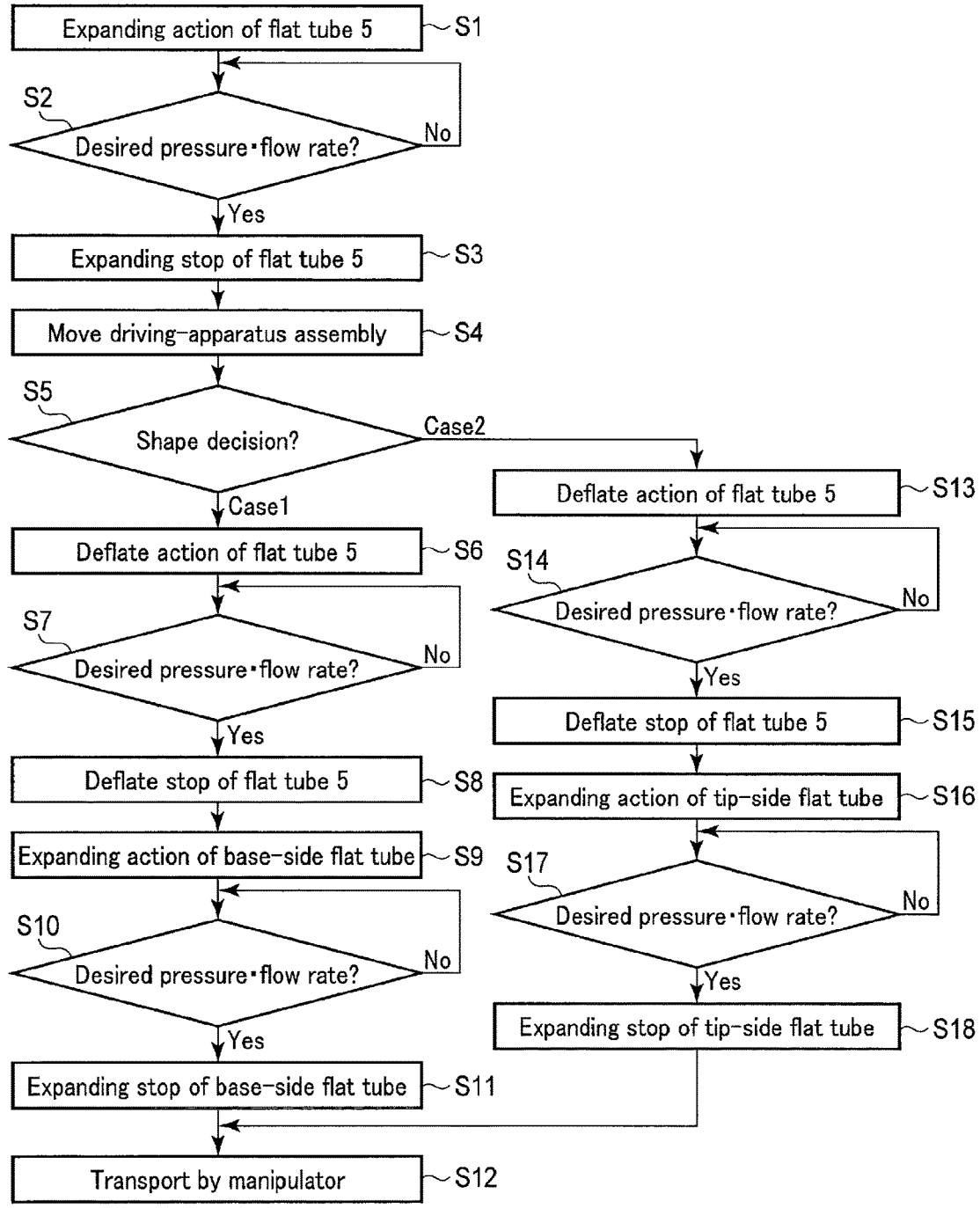
FIG. 11 is a flowchart showing a process by which the driving-apparatus assembly according to the second embodiment holds an object.

FIG. 11 shows a flowchart showing a process by which the driving-apparatus assembly 40 holds an object.

When the process starts, the controller 11 drives the change-over valve 15 to inflate the flat tube 5 and to make the driving-apparatus assembly 40 being in the straight situation (step S1).

The decision portion 85 uses the pressure sensor 23 and the flow-rate sensor 26 and judges whether or not a pressure or a flow rate of the fluid in the tube 18 connected to the flat tube 5 becomes a desired pressure or a desired flow rate. When a pressure or a flow rate of the fluid in the tube 18 does not become the desired pressure or the desired flow rate, a flow in the flowchart returns to the step which is previous to the judgement and repeats the same step (step S2).

After the pressure or the flow rate of the fluid in the flat tube 5 becomes the desire pressure or the desired flow rate, the controller 11 controls the change-over valve 1 to stop the supply of the fluid. Specifically, the driving control portion 84 receives a command for instructing a driving stop from the decision portion 85 and controls the change-over valve 15 by using the driver 86 to stop the supply of the fluid (step S3).

The controller 11 moves the driving-apparatus assembly 40 installed in the tip of the manipulator to hold the object. Position information of the object is designated by using a predetermined distance, a position obtained by an external information collecting device such as a camera or a recognition through eyes of an operator, and the like (step S4).

The controller 11 judges a shape of the object. The shape of the object is recognized through information obtained from an external information collecting device such as a camera or recognized by the eyes of an operator, and the like. The controller 11 compares detected shape data of the object with a size date of the driving-apparatus assembly 40 when it opens or closes recorded in advance, and judges whether the driving-apparatus assembly 40 is firstly bent in its base side or its tip end side. In a case in which the driving-apparatus assembly 40 is firstly bent in its base side, a flow in the flowchart advances to a "CASE 1". And, in a case in which the driving-apparatus assembly 40 is firstly bent in its tip end side, the flow in the flowchart advances to a "CASE 2". Specifically, the command generating portion 81 receives a shape recognition information from the decision portion 85 and selectively outputs a driving instruction to the change-over valve 15 through the desired value generating portion 83, the driving control portion 84 and the driver 86 (step S5).

In the CASE 1, the controller 11 makes the fluid being sucked from the flat tube 5 to deflate the flat tube 5 (step S6).

The decision portion 85 judges whether or not the pressure or the flow rate of the fluid in the tube 18 connected to the flat tube 5 becomes a desired pressure or a desired flow rate by using the pressure sensor 23 and the flow-rate sensor 26 (step S7).

When the pressure or the flow rate of the fluid in the tube 18 becomes a desired pressure or a desired flow rate, the controller 11 makes the suction of the fluid from the flat tube 5 being stopped (step S8).

The controller 11 makes the fluid being supplied from the flat tube 4b of the base side (step S9).

The decision portion 85 judges whether or not a pressure or a flow rate of the fluid in the tube 16 connected to each flat tube becomes a desired pressure or a desired flow rate by using the pressure sensors 21 and 22 and the flow-rate sensors 24 and 25. When the pressure or the flow rate of the fluid in the tube 16 does not become a desired pressure or a desired flow rate, a flow in the flowchart returns to the step which is previous to the judgement and repeats the same step (step S10).

After it is recognized that the pressure or the flow rate of the fluid in the tube 16 becomes the desired pressure or the desired flow rate, the controller 11 makes the change-over valve 15 stop the supply of the fluid. Specifically, the driving control portion 84 receives a command for instructing a driving stop from the decision portion 85 and stops the change-over valve through the driver 86 (step S11).

The manipulator transfer the object held by the driving-apparatus assembly 40 (step S12).

The CASE 1 is suitable for holding a spherical object as shown in FIG. 9.

A flowchart of the CASE 2 is similar to that of the CASE 1.

In the CASE 2, the controller 11 firstly makes the fluid being supplied to the flat tube 3 (step S16).

The CASE 2 is suitable for holding a box-shaped object as shown in FIG. 10.

Figure 12:
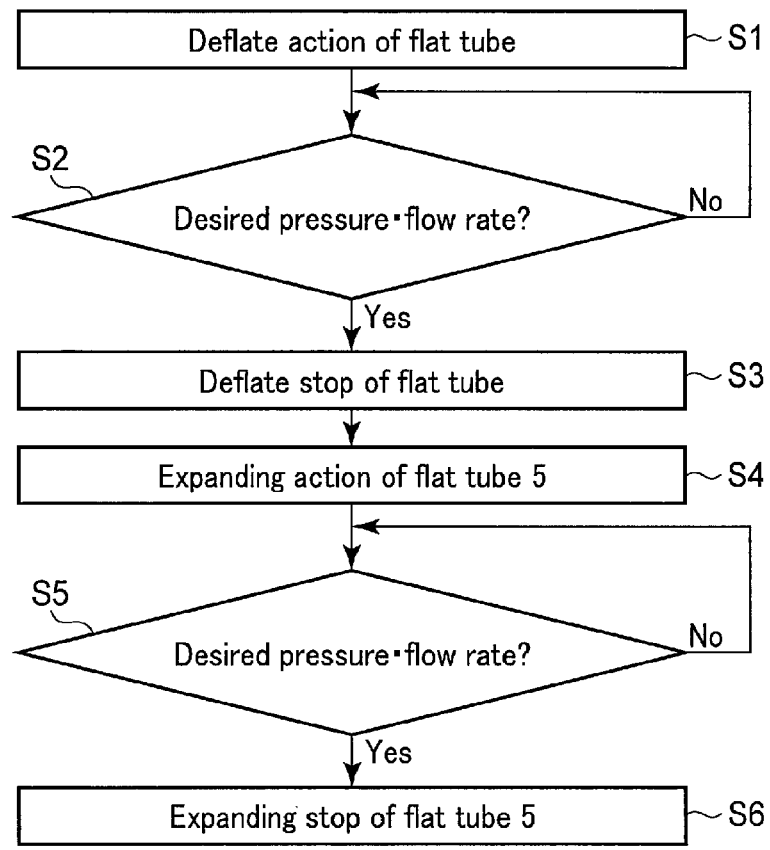
FIG. 12 is a flowchart showing a process by which the driving-apparatus assembly according to the second embodiment releases the object.

FIG. 12 shows a flowchart showing a process by which the driving-apparatus assembly 40 releases an object.

The controller 11 drives the change-over valve 15 to suck the fluid from the flat tube 3 or 4b. In both of the CASES 1 and 2 of FIG. 11, the fluid may be firstly sucked from either the flat tube 3 or the flat tube 4b (step S1).

The decision portion 85 judges whether or not a pressure or a flow rate of the fluid in the tube 16 becomes a desired pressure or a desired flow rate by using the pressure sensors 21 and 22 and the flow-rate sensors 24 and 25. When a pressure of the fluid in the flat tube does not become a desired pressure, a flow in the flowchart returns to the step which is previous to the judgement and repeats the same step (step S2).

After it is judged that the pressure or the flow rate of the fluid in the tube 16 becomes a desired pressure or a desired flow rate, the controller 11 controls the change-over valve to stop the supply of the fluid. Specifically, the driving control portion 84 receives a command for instructing a driving stop from the decision portion 85 and stops the change-over valve 15 by using the driver 86 (step S3).

The controller 11 drives the change-over valve 15 to inflate the flat tube 5 and makes the driving-apparatus assembly 40 being in the straight situation (step S4).

The decision portion 85 judges whether or not a pressure or a flow rate of the fluid in the tube 18 connected to the flat tube 5 becomes a desired pressure or a desired flow rate by using the pressure sensor 23 and the flow-rate sensor 26. When the pressure of the fluid in the tube 18 does not become a desired pressure or a desired flow rate, a flow in the flowchart returns to the step which is previous to the judgement and repeats the same step (step S5).

After it is recognized that the pressure or the flow rate of the fluid in the tube 18 become the desired pressure or the desired flow rate, the controller 11 controls the change-over valve 15 to stop the supply of the fluid. Specifically, the driving control portion 84 receives a command for instructing a driving stop from the decision portion 85 and stops the change-over valve 15 by using the driver 86 (step S6).

The driving-apparatus assembly 40 releases the object. By controlling the driving-apparatus assembly 40 as described above, the driving-apparatus assembly 40 can grip target objects having various shapes.

Third Embodiment

Figure 13:
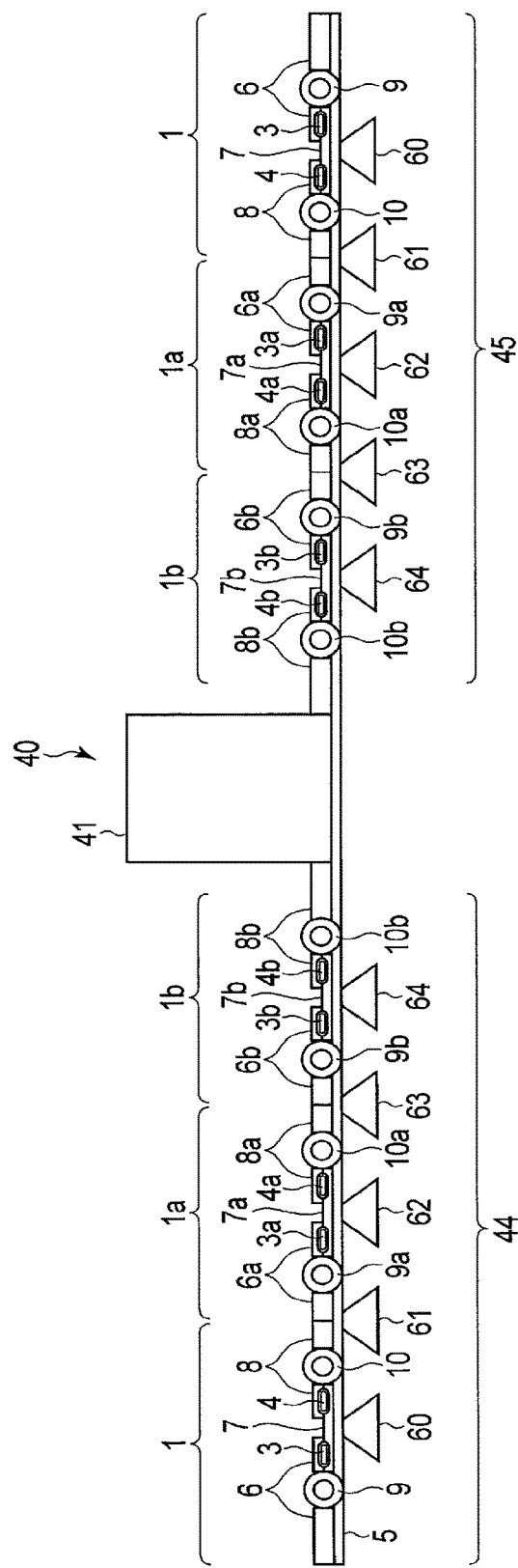
FIG. 13 is a side view showing a driving-apparatus assembly using suction pads and according to a third embodiment.

FIG. 13 shows the driving-apparatus assembly 40 provided with suction pads (sucking portions) 60 to 64.

The suction pads 60 to 64 are provided on surfaces of the first and second portions 44 and 45 which contact an object at a suitable interval.

Each of the suction pads 60 to 64 may be structured to combine with a vacuum generator such as a vacuum ejector, a vacuum pump and a vacuum blower. Each of the suction pads 60 to 64 is a suction cup or the like formed of rubber or resin. For example, instead of the suction cup, a gluing agent, a gluing tape or the like may also be used. The number of the suction pads provided on the driving-apparatus assembly 40 may be any number.

Figure 14:
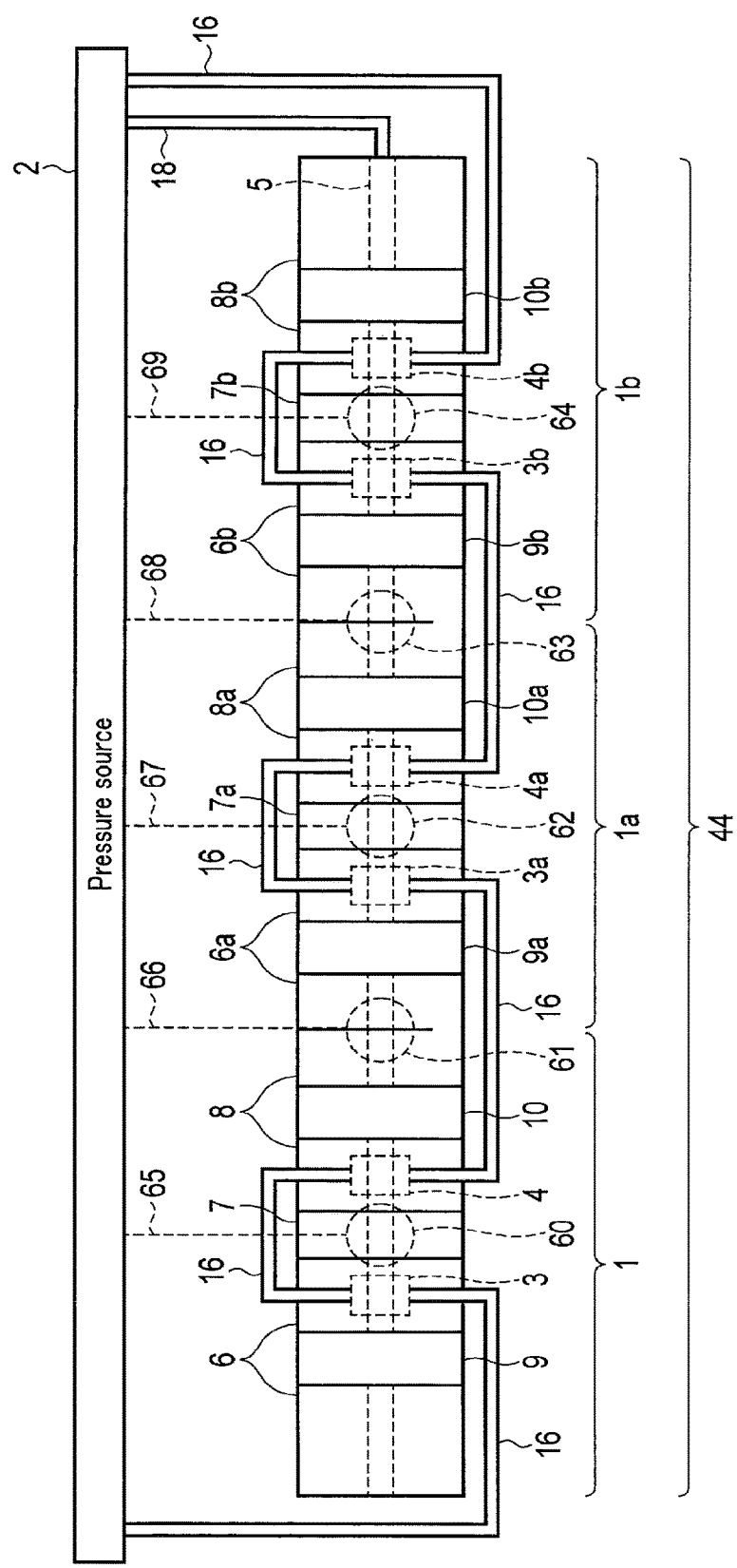
FIG. 14 is a plan view showing a first part of the driving-apparatus assembly according to the third embodiment.

FIG. 14 shows a plan view of the first portion 44.

The suction pads 60 to 64 are respectively connected to one-ends of tubes 65 to 69 indicated by dashed lines. The other ends of the tubes 65 to 69 are connected to the pressure source 2.

The tubes 65 to 69 may be connected to different pressure sources. A structure of the second portion 45 is the same as that of the first portion 44.

Figure 15:
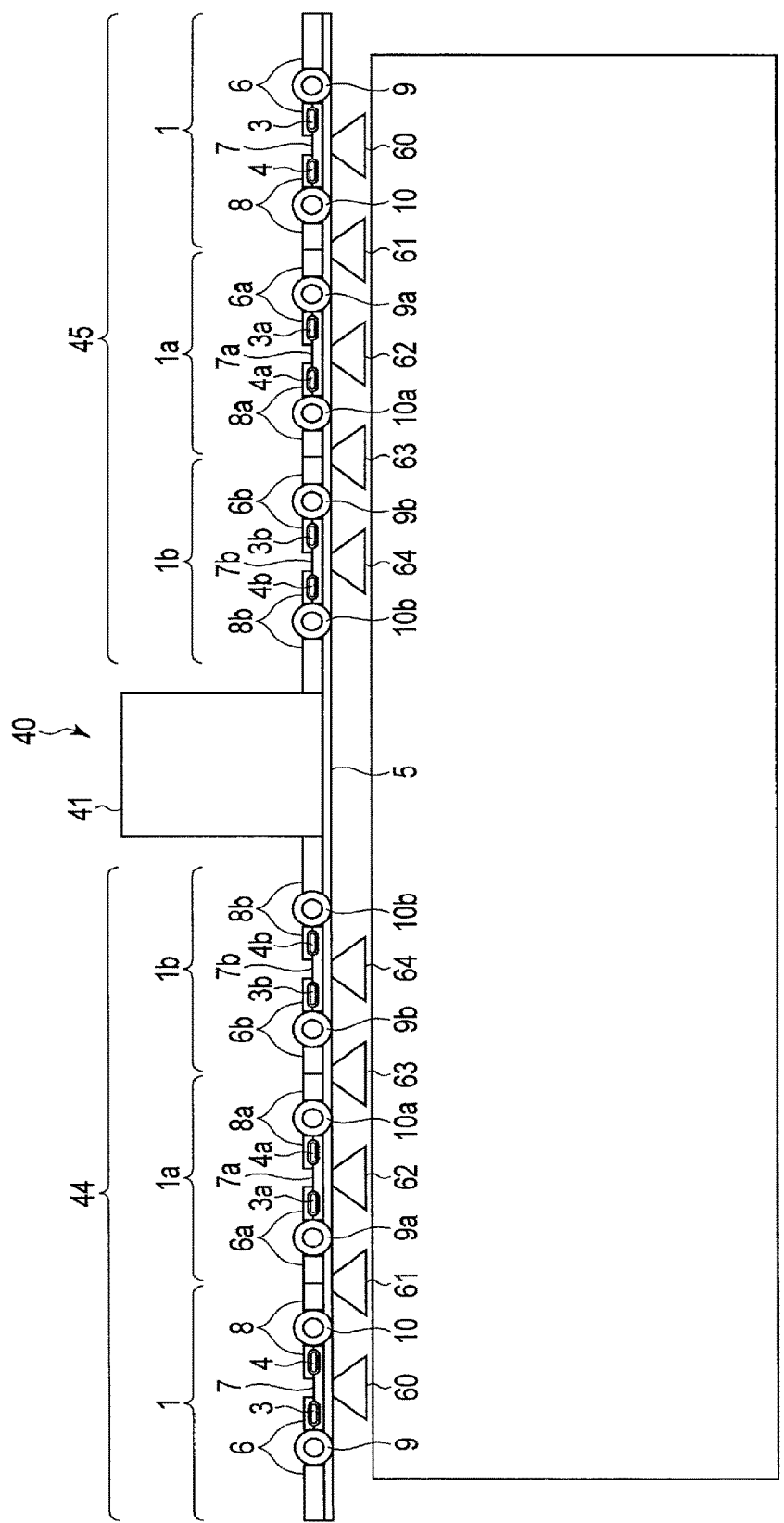
FIG. 15 is a side view showing a situation in which the driving-apparatus assembly according to the third embodiment holds a box-shaped object.

FIG. 15 shows a situation in which the driving-apparatus assembly 40 holds a box-shaped object 70.

A movement of the first portion 44 for making the driving-apparatus assembly 40 hold the object 70 will be described. The suction pads 60 to 64 provided on the first portion 44 are come into contact with a top surface of the object 70. When the suction device 12 of the pressure source 2 sucks the fluid from an internal space of the suction pad 60 through the tube 65, a pressure inside the suction pad 60 is reduced so that the suction pad 60 adheres the object 70. When the suction device 12 of the pressure source 2 respectively sucks the internal fluids from the suction pads 60 to 64 through the tubes 66 to 69, a pressure inside each of the suction pads 60 to 64 is reduced so that each of the suction pads 60 to 64 adheres the object 70.

Similar to the first portion 44, each of the suction pads 60 to 64 of the second portion 45 adheres the object 70. The driving-apparatus assembly 40 holds the object 70 and can transfer the object 7 to an arbitrary position by an operation of the manipulator.

When the object 70 is not ventilatable, the internal pressures of the suction pads 60 to 64 of the first and second portions 44 and 45 are maintained while the driving-apparatus assembly 40 holds the object 70. When the object 70 is ventilatable, the suction device 12 sucks the internal fluid at a flow rate more than an amount of the fluid leaking from the object 70 in order to maintain the internal pressures of the suction pad 60 to 64 of the first and second portions 44 and 45.

A case in which the driving-apparatus assembly 40 releases the object 70 will be described. The controller 11 controls the pressure device 13 to supply the fluid to each of the suction pads 60 to 64 of the first and second portions 44 and 45. The internal pressures of the suction pads 60 to 64 increase. Each of the suction pads 60 to 64 releases the object 70.

Since the suction pads 60 to 64 of the driving-apparatus assembly 40 individually adhere the object, the driving-apparatus assembly 40 can hold an object larger than the driving-apparatus assembly 40. The driving-apparatus assembly 40 can hold the spherical object 48 or the concave object 49.

Even when any one of the suction pads 60 to 64 is broken and is not able not adhere the object, the driving-apparatus assembly 40 can hold the object by using other suction pads which are not broken. The fluids sucked from each of the suction pad 60 to 64 may be a liquid as well as a gas such as the air.

Figure 16:
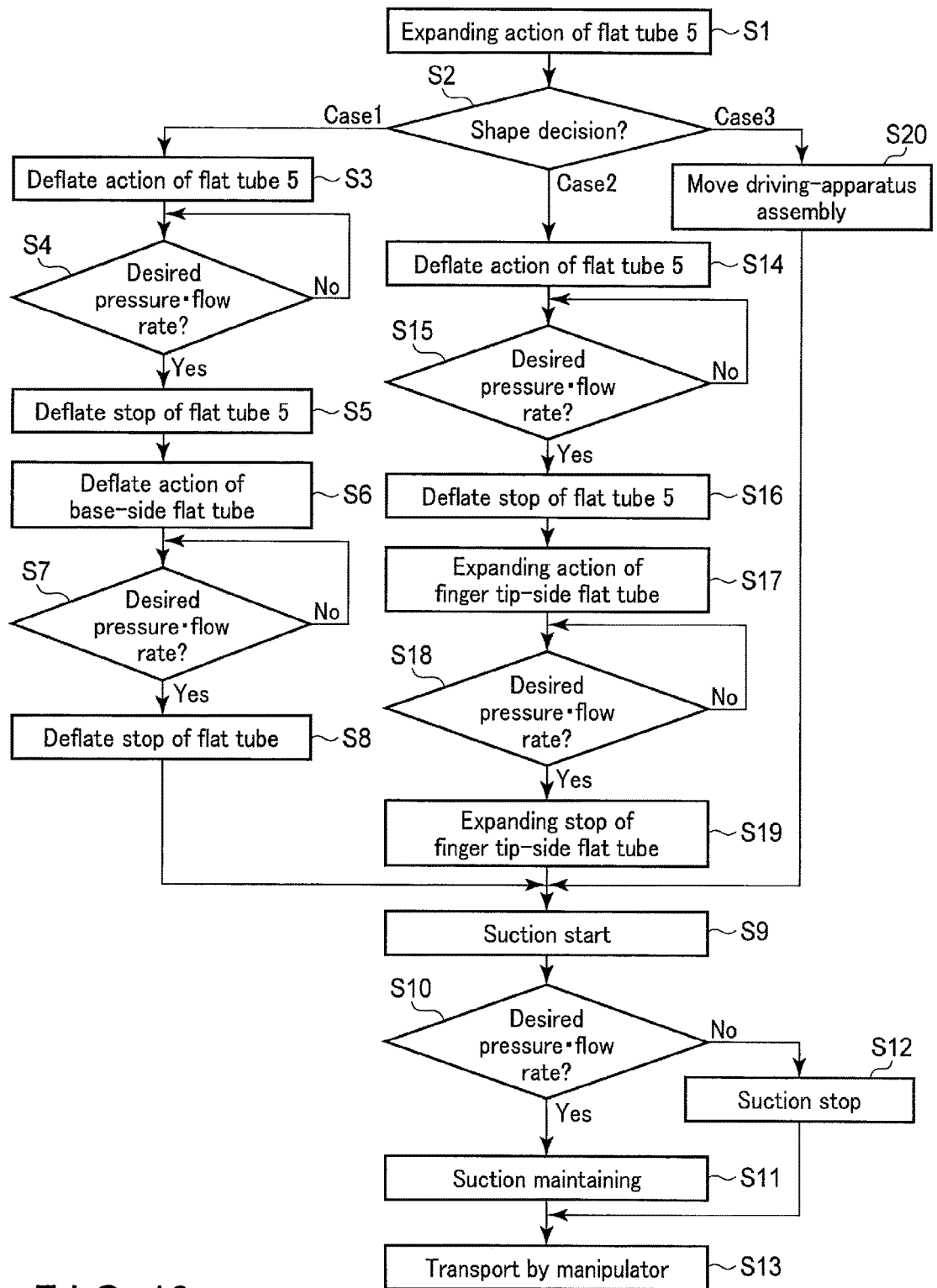
FIG. 16 is a flowchart showing a process by which the driving-apparatus assembly according to the third embodiment holds an object.

FIG. 16 shows a flowchart showing a process by which the driving-apparatus assembly 40 holds an object. When the process starts, the controller 11 drives the change-over valve 15 to inflate the flat tube 5 and to make the driving-apparatus assembly 40 being in the straight situation (step S1).

The controller 11 judges a shape of the object. The shape of the object is recognized through information obtained from the external information collecting device such as a camera or recognized by the eyes of the operator, and the like. The controller 11 compares recognized shape data of the object with a size date of the driving-apparatus assembly 40 when it opens or closes recorded in advance, and judges whether the driving-apparatus assembly 40 is firstly bent in its base side or its tip end side. In a case in which the driving-apparatus assembly 40 is firstly bent in its base side, a flow in the flowchart advances to a "CASE 1". And, in a case in which the driving-apparatus assembly 40 is firstly bent in its tip end side, the flow in the flowchart advances to a "CASE 2". Further, in a case in which the driving-apparatus assembly 40 is not bent the flow in the flowchart advances to a "CASE 3". Specifically, the command generating portion 81 receives a shape recognition information from the decision portion 85 and selectively outputs a driving instruction to the change-over valve 15 through the desired value generating portion 83, the driving control portion 84 and the driver 86 (step S2).

In the CASE 1, the controller 11 makes the fluid being sucked from the flat tube 5 to deflate the flat tube 5 (step S3).

The decision portion 85 judges whether or not a pressure or a flow rate of the fluid in the tube 18 connected to the flat tube 5 becomes a desired pressure or a desired flow rate by using the pressure sensor 23 and the flow-rate sensor 26 (step S4).

When the pressure or the flow rate of the fluid in the tube 18 becomes a desired pressure or a desired flow rate, the controller 11 makes the suction of the fluid from the flat tube 5 being stopped (step S5).

The controller 11 makes the fluid being supplied from the flat tube 4b of the base side (step S6).

The decision portion 85 judges whether or not a pressure or a flow rate of the fluid in the tube 16 becomes a desired pressure or a desired flow rate by using the pressure sensors 21 and 22 and the flow-rate sensors 24 and 25. When the pressure or the flow rate of the fluid in the tube 16 does not become the desired pressure or the desired flow rate, a flow in the flowchart returns to the step which is previous to the judgement and repeats the same step (step S7).

After it is recognized that the pressure or the flow rate of the fluid in the tube 16 becomes the desired pressure or the desired flow rate, the controller 11 makes the change-over valve 15 stop the supply of the fluid. Specifically, the driving control portion 84 receives a command for instructing a driving stop from the decision portion 85 and stops the change-over valve through the driver 86 (step S8).

The controller 11 makes the fluid in the suction pads 60 to 64 being sucked (step S9).

The decision portion 85 judges whether or not a pressure or a flow rate of the fluid in the suction pads 60 to 64 becomes a desired pressure or a desired flow rate by using pressure sensors and flow-rate sensors. Although not shown in FIG. 14, each of the tubes 65 to 69 is provided with the pressure sensor and the flow-rate sensor (step S10).

After the controller 11 recognizes that the pressure or the flow rate of the fluid in each of the suction pads 60 to 64 becomes the desired pressure and the desired flow rate, the controller 11 maintains the suction of the fluid from each of the suction pads 60 to 64 (step S11).

When the pressure or the flow rate of the fluid in each of the suction pads 60 to 64 does not become the desired pressure and the desired flow rate, the controller 11 stops the suction of the fluid from each of the suction pads 60 to 64 (step S12).

After the suction pads 60 to 64 adhere to the object, the controller 11 controls the manipulator to make the driving-apparatus assembly 40 transfer the object held by the driving-apparatus assembly 40 (step S13).

The CASE 1 is suitable for holding a spherical object. A flowchart of the CASE 2 is similar to that of the CASE 1. In the CASE 2, the controller 11 makes the fluid being firstly supplied to the flat tube 3 (step S17).

The CASE 2 is suitable for holding a box-shaped object.

The CASE 3 is for holding an object having a flat surface. The controller 11 moves the driving-apparatus assembly 40 to a position of the object (step S20).

The flowchart subsequent to step S9 is similar to that of each of CASE 1 and CASE 2.

Figure 17:
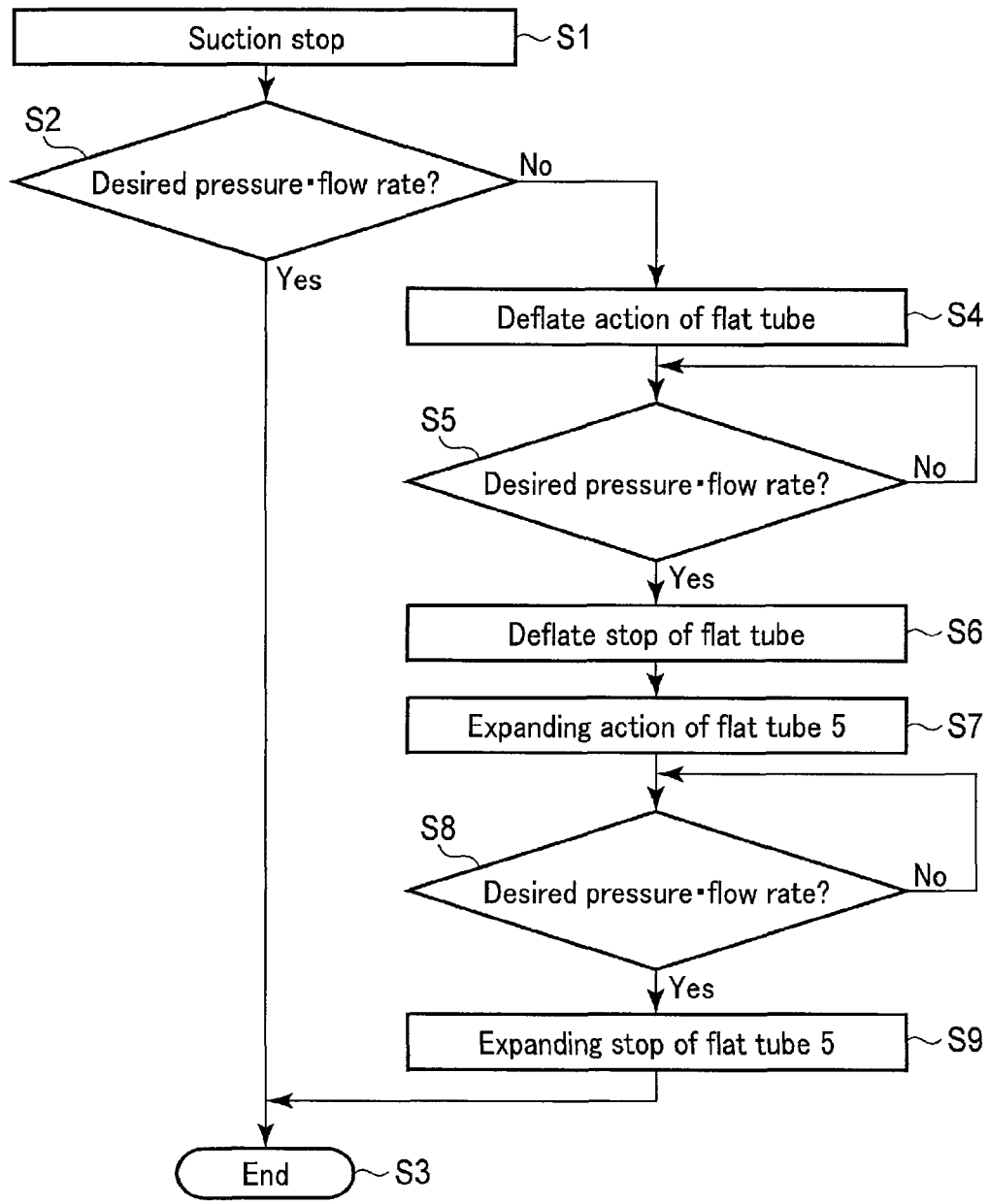
FIG. 17 is a flowchart showing a process by which the driving-apparatus assembly according to the third embodiment releases the object.

FIG. 17 shows a flowchart for making the driving-apparatus assembly 40 release an object.

The controller 11 stops the suction of the internal fluid from the suction pads 60 to 64 (step S1).

The controller 11 makes the fluid being supplied to the flat tube 5. The decision portion 85 judges whether or not a pressure or a flow rate of the fluid in the flat tube 5 becomes a desired pressure or a desired flow rate by using the pressure sensor 23 and the flow-rate sensor 26 (step S2).

After the controller 11 recognizes that the pressure or a flow rate of the fluid in the flat tube 5 become the desired pressure or the desired flow rate, the controller 11 controls the driving-apparatus assembly 40 to release the object, and the object releasing work finishes (step S3).

When the pressure or the flow rate of the fluid in the flat tube 5 does not become a desired pressure or flow rate in step S2, the controller 11 drives the change-over valve 15 to suck the fluid from each of the flat tubes through the tube 16 (step S4).

The decision portion 85 judges whether or not a pressure or a flow rate of the fluid in the tube 16 becomes a desired pressure or a desired flow rate by using the pressure sensors 21 and 22 and the flow-rate sensors 24 and 25. When the pressure or the flow rate of the fluid in the tube 16 does not become the desired pressure or the desired flow rate, a flow in the flowchart returns to the step which is previous to the judgement and repeats the same step (step S5).

After the controller 11 recognizes that the pressure or the flow rate of the fluid in the tube 16 becomes the desired pressure or the desired flow rate, the controller 11 controls the change-over valve 15 to stop the supply of the fluid. Specifically, the driving control portion 84 receives a command for instructing a driving stop from the decision portion 85 and stops the change-over valve by using the driver (step S6).

The controller 11 drives the change-over valve 15 to inflate the flat tube 5 and to make the driving-apparatus assembly 40 being in a straight situation (step S7).

The decision portion 85 judges whether or not a pressure or a flow rate of the fluid in the tube 18 connected to the flat tube 5 becomes a desired pressure or a desired flow rate by using the pressure sensor 23 and the flow-rate sensor 26. When the pressure or the flow rate of the fluid in the tube 18 does not become the desired pressure or the flow rate, a flow in the flowchart returns to the step which is previous to the judgement and repeats the same step (step S8).

After the controller 11 recognizes that the pressure or the flow rate of the fluid in the tube 18 becomes the desired pressure or the desired flow rate, the controller 11 controls the change-over valve 15 to stop the supply of the fluid. Specifically, the driving control portion 84 receives a command for instructing a driving stop from the decision portion 85 and stops the change-over valve 15 by using the driver 86 (step S9).

The driving-apparatus assembly 40 releases the object. Through the control of the driving-apparatus assembly 40 described above, the driving-apparatus assembly 40 can hold objects having various shapes.

Fourth Embodiment

Figure 18:
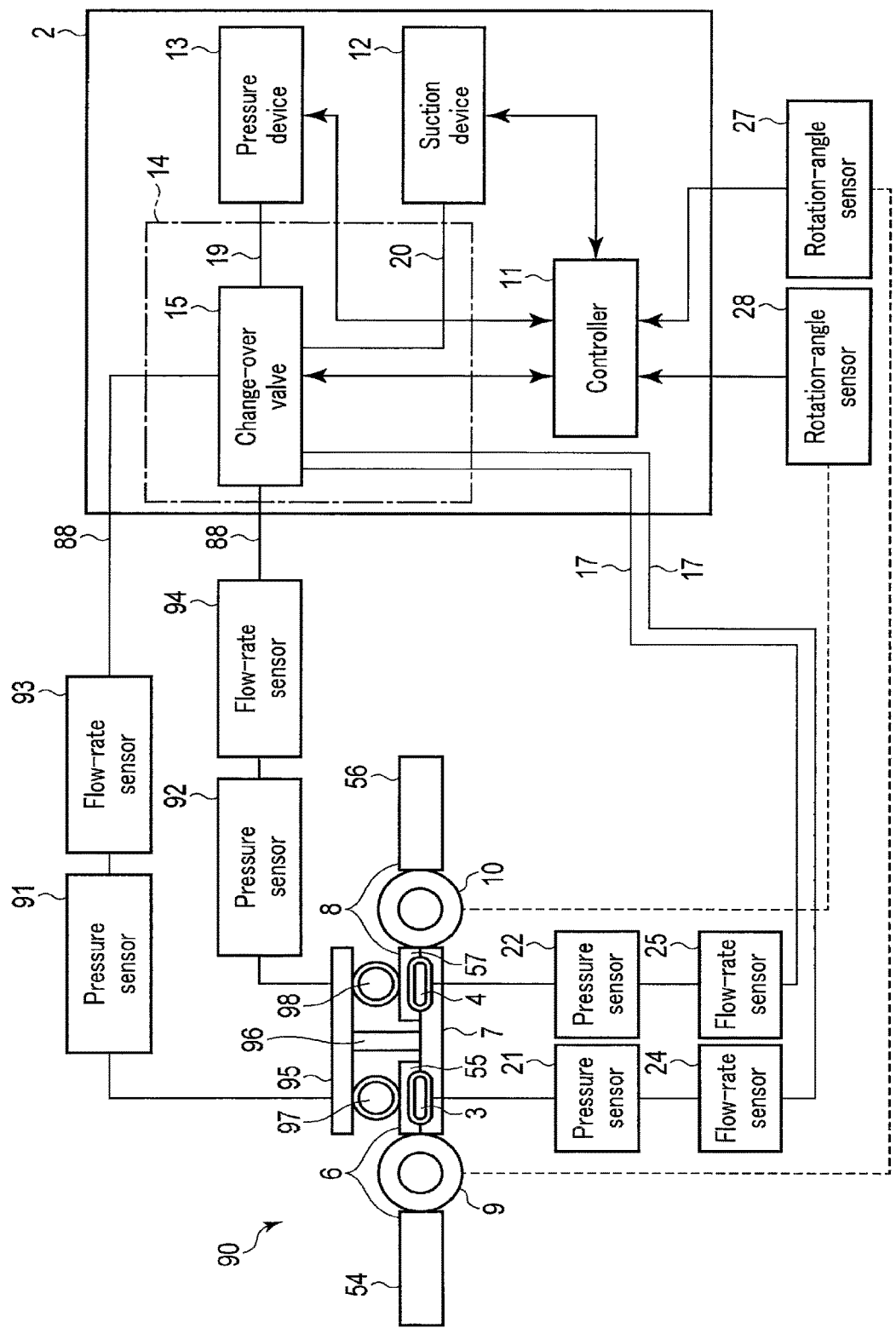
FIG. 18 is a view showing a structure of a driving apparatus and pressure source according to a fourth embodiment.

FIG. 18 shows a driving apparatus 90 and the pressure source 2 connected to the driving apparatus 90.

The driving apparatus 90 is structured by excluding the flat tube 5 from the structure of the driving apparatus 1 of FIG. 1 and by further adding a link (second support) 95, a connecting portion 96, a flat tube (second elastic body) 97 and a flat tube (fourth elastic body) 98 in the structure the driving apparatus 1. A structure of the pressure source 2 is the same as that of the pressure source 2 of FIG. 1.

A link (first support) 7 having a first surface and the link 95 having a second surface are positioned oppositely. The links 7 and 95 are connected to each other by the connecting portion 96. The link 7 has a first end portion and a second end portion opposite to the first end portion. A joint 9 is connected to the first end portion of the link 7. The joint 10 is connected to the second end portion of the link 7.

The link 6 includes first and second support members 55 and 54. The first support member 55 is positioned between the joint 9 and the connecting portion 96 and between the links 7 and 95 and is connected to the joint 9. The second support member 54 is connected to the joint 9 to sandwich the joint 9 between the first and second support members 55 and 54.

The link 8 includes third and fourth support members 57 and 56. The third support member 57 is positioned between the joint 10 and the connecting portion 96 and between the links 7 and 95 and is connected to the joint 10. The fourth support member 56 is connected to the joint 10 to sandwich the joint 10 between the third and fourth support members 57 and 56.

The flat tube 3 is positioned between the first support member 55 and the link 7 and is provided on the link 7. The flat tube 97 is positioned between the first support member 55 and the link 95 and is provided on the link 95.

The flat tube 4 is positioned between the third support member 57 and the link 7 and is provided on the link 7. The flat tube 98 is positioned between the third support member 57 and the link 95 and is provided on the link 95.

A tube 88 is connected to each of the flat tubes 97 and 98, and the flat tubes 97 and 98 are connected to each other in series through the tube 88. Both ends of the tube 88 are connected to the change-over valve 15 of the pressure source 2.

The tube 88 is provided with a pressure sensor 91 for detecting a pressure of the fluid in the flat tube 97 and a flow-rate sensor 93 for detecting a flow rate of the fluid in the flat tube 97. The tube 88 is provided with a pressure sensor 92 for detecting a pressure of the fluid in the flat tube 98 and a flow-rate sensor 94 for detecting a flow rate of the fluid in the flat tube 98. Each of the pressure sensors 21, 22, 91 and 92 is referred to as a first sensor.

Similar to the cases of the flat tubes 3 and 4, the controller 11 controls the change-over valve 15, the pressure device 13 and the suction device 12 to supply the fluid to or to suck the fluid from each of the flat tubes 97 and 98. Each of the flow-rate sensors 24, 25, 93 and 94 is referred to as a second sensor.

FIGS. 19A to 19F shows steps S1 to S6 of motions of the driving apparatus 90 around the joints 9 and 10.

FIG. 19A shows a situation in which the fluid is not supplied to the flat tubes 3 and 4, but the fluid is supplied to the flat tubes 97 and 98 to inflate the flat tubes 97 and 98 (step S1).

When the fluid is supplied to the flat tube 3 through the tube 17, the flat tube 3 inflates. And, the fluid is sucked from the flat tube 98 through the tube 88, the flat tube 97 deflates. In this time, the joint 9 pivots in an arrow direction of FIG. 19B, and the link 6 also pivots around the joint 9 (FIG. 19B: step S2).

When the fluid is further supplied to the flat tube 3 through the tube 17, the flat tube 4 inflates. When the fluid is sucked from the flat tube 98 through the tube 88, the flat tube 98 deflates. In this time, the joint 10 pivots in an arrow direction of FIG. 19C, and the link 8 is also pivots around the joint 10 (FIG. 19C; step S3).

When the fluid is sucked from the flat tube 3 through the tube 17, the flat tube 4 deflates. As the flat tube 4 is more deflated, the joint 10 can be more pivoted in an arrow direction of FIG. 19D and the link 8 can be pivoted around the joint 10 (FIG. 19D; step S4).

When the fluid is further sucked from the flat tube 3 through the tube 17, the flat tube 3 deflates. As the flat tube 3 is more deflated, the joint 9 can be more pivoted in an arrow direction of FIG. 19E and the link 6 can be pivoted around the joint 9 (FIG. 19E; step S5).

When the fluid is supplied to the flat tube 98 through the tube 88, the flat tubes 98 and 97 are inflated sequentially in this order. In this time, when the flat tube 98 inflates, the joint 10 pivots in an arrow direction of FIG. 19F and the link 8 also pivots around the joint 10. When the flat tube 97 inflates, the joint 9 pivots in an arrow direction of FIG. 19F and the link 6 also pivots around the joint 9 (FIG. 19F; step S6).

Each of the flat tubes 3, 4, 97 and 98 is small-sized and lightweight. Since each of them is deformed only in its radial direction, a deformation transition of each flat tube can be easily predicted. Therefore, the flat tubes 3, 4, 97 and 98 can be mechanically strongly fixed to the driving apparatus under consideration of their deformation transitions in advance.

Since the driving apparatus 90 has a symmetrical structure in its right and left directions, the driving apparatus 90 can be halved and only one half can be driven. For example, in a case of the driving apparatus 90 of FIG. 18, only a half part structured by the link 7, the flat tube 3, the link 6, the joint 9, the flat tube 97, the link 95 and the connecting portion 96 can be driven. In this case, the link 7 has a first end portion and a second end portion opposite to the first end portion. The connecting portion 96 has a first one-end and a first the-other-end. The link 95 has a third end portion and a fourth end portion opposite to the third end portion. The joint 9 is connected to the first end portion of the link 7. The first one-end of the connecting portion 96 is connected to the second end portion of the link 7. The first the-other-end of the connecting portion 96 is connected to the third end portion of the link 95. Similar to the driving apparatus 1 of FIGS. 6A and 6B, the driving apparatus 90 can hold an object by changing a position the link 6 at which the link 6 is connected to the joint 9.

Note that, in various embodiments, the processes of the controller 11 are performed by a central processing unit (CPU) using a software program stored in an external storage such as a memory, they may be performed only by an electronic circuit (hardware) which is not use the CPU. In addition, they may be performed by using a cloud server.

Instructions or commands in processing sequences shown in various embodiments can be executed based on a software program. A general-purpose computer system stores this program and the program is read therefrom to obtain the same functional effects as those of the processing sequence described above.

The instructions or commands described in various embodiments are recorded as a computer executable program on a recording medium such as a magnetic disc (such as a flexible disc, a hard disk drive and the like), an optical disc (such as CD-ROM, CD-R, CD-RW, DVD-ROM, DVD±R, DVD±RW, Blue-Ray® Disc and the like), a solid-state memory or other recording medium similar to them). If a computer or embedded system is a recording medium from which data can be read, any memory format may be employed as a memory format thereof. The computer is capable of executing operations similar to those executed by the aforementioned processing sequence when the computer reads a program from the recording medium and executes the instructions or commands described in the program by the CPU, based on this program. Naturally, the computer may obtain or read the program via network when the computer obtains or reads the program.

A part of the processing sequence may be executed by an operating system (OS), a database management software program or a middleware (MW) such as a network operated on a computer based on instructions or commands of a program installed in a computer or embedded system from a recording medium. Further, the recording medium in the various embodiments are not limited to a medium independent from a computer or embedded system, but may include a recording medium which downloads a program via the LAN or the Internet and stores or temporarily stores the program. Moreover, the recording medium is not limited to a single medium, but the process may be executed on a plurality of media. Any formation may be employed as a recording medium.

It should be noted that the computer or embedded systems in the various embodiments execute each process of the every embodiments based on a program stored in a recording medium, and they may be a single unit such as a personal computer, a microcomputer or the like or a system in which a plurality of units are connected with a network. In the various embodiments, the computer is not limited to a personal computer, but may include an arithmetic processing unit or a microcomputer embedded in an information processing device. That is, the computer generally includes a device or a apparatus capable of executing functions of various embodiments based on a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A driving apparatus comprising:
    a joint;
    a first support member connected to the joint;
    a second support member connected to the joint;
    a first elastic body including a flat tube with inflatable or deflatable flat surface areas, and provided along the joint, the first support member and the second support member;
    a support provided with a first end portion and a second end portion opposite to the first end portion and placed between the first support member and the first elastic body, the first end portion being connected to the joint; and
    a second elastic body including a flat tube with inflatable or deflatable flat surface areas and inserted between the support and the first support member.

2. The driving apparatus according to claim 1, wherein each of the first and second elastic bodies is provided with a flow passage, and
    the driving apparatus further comprises:
    a first sensor provided in each of the first and second elastic bodies to detect a pressure of the flow passage of each of the first and second elastic bodies;
    a second sensor provided in each of the first and second elastic bodies to detect a flow rate of the flow passage of each of the first and second elastic bodies; and
    a third sensor provided in the joint to detect an angle of the joint.

3. The driving apparatus according to claim 2, further comprising a control portion configured to perform control such that the first and second elastic bodies are inflated or deflated.

4. The driving apparatus according to claim 2, wherein the control portion is configured to inflate or deflate the first and second elastic bodies on the basis of information detected from the first and second sensors.

5. The driving apparatus according to claim 1, further comprising a control portion configured to perform control such that the first and second elastic bodies are inflated or deflated.

6. The driving apparatus according to claim 5, wherein the control portion is configured to inflate the second elastic body after deflating the first elastic body.

7. The driving apparatus according to claim 5, wherein the control portion is configured to inflate the first elastic body after deflating the second elastic body.

8. A driving apparatus comprising:
    a support having a first end portion and a second end portion opposite to the first end portion;
    a first joint connected to the first end portion;
    a second joint connected to the second end portion;
    a first support member placed between the first joint and the second joint and connected to the first joint;
    a second support member connected to the first joint and cooperating with the first support member to sandwich the first joint;
    a third support member placed between the first joint and the second joint and connected to the second joint;
    a fourth support member connected to the second joint and cooperating with the third support member to sandwich the second joint;
    a first elastic body including a flat tube with inflatable or deflatable flat surface areas, and provided along the second support member, the first joint, the support, the second joint and the fourth support member;
    a second elastic body including a flat tube with inflatable or deflatable flat surface areas, and inserted between the first support member and the support; and
    a third elastic body including a flat tube with inflatable or deflatable flat surface areas, and inserted between the third support member and the support.

9. The driving apparatus according to claim 8, wherein each of the first, second and third elastic bodies is provided with a flow passage, and
    the driving apparatus further comprises:
    a first sensor provided in each of the first, second, and third elastic bodies to detect a pressure of the flow passage of each of the first, second and third elastic bodies;
    a second sensor provided in each of the first, second and third elastic bodies to detect a flow rate of the flow passage of each of the first, second and third elastic bodies; and
    a third sensor provided in each of the first and second joints to detect an angle of each of the first and second joints.

10. The driving apparatus according to claim 9, wherein the second elastic body is connected to the third elastic body, and
    the driving apparatus further comprises a control portion configured to inflate or deflate the first, second and third elastic bodies.

11. The driving apparatus according to claim 9, wherein the control portion is configured to inflate or deflate the first, second or third elastic bodies on the basis of information detected from the first and second sensors.

12. The driving apparatus according to claim 8, wherein the second elastic body is connected to the third elastic body, and
    the driving apparatus further comprises a control portion configured to inflate or deflate the first, second and third elastic bodies.

13. The driving apparatus according to claim 12, wherein the control portion is configured to inflate the second and third elastic bodies sequentially in this order after deflating the first elastic body.

14. The driving apparatus according to claim 12, wherein the control portion is configured to inflate the third and second elastic bodies sequentially in this order after deflating the first elastic body.

15. The driving apparatus according to claim 12, wherein the control portion is configured to inflate the first elastic body after deflating the third and second elastic bodies sequentially in this order.

16. The driving apparatus according to claim 12, wherein the control portion is configured to inflate the first elastic body after deflating the second and third elastic bodies sequentially in this order.

17. The driving apparatus according to claim 8, further comprising at least one suction portion provided on a side of the support where the first elastic body is provided.

18. A driving apparatus comprising:
- a first support having a first surface and a first end portion;
- a second support having a second surface which faces the first surface of the first support;
- a connecting portion connecting the first surface of the first support with the second surface of the second support;
- a joint connected to the first end portion of the first support;
- a first support member placed between the joint and the connecting portion and between the first and second supports, and connected to the joint;
- a first elastic body inserted between the first support member and the first support, and including a flat tube with inflatable or deflatable flat surface areas;
- a second elastic body inserted between the first support member and the second support, and including a flat tube with inflatable or deflatable flat surface areas; and
- a second support member connected to the joint and cooperating with the first support member to sandwich the joint.

* * * * *